(12) United States Patent
Hoshino et al.

(10) Patent No.: US 11,578,416 B2
(45) Date of Patent: Feb. 14, 2023

(54) PLANT CONTROL METHOD, PLANT CONTROL DEVICE, PROGRAM, AND PLANT

(71) Applicant: JGC CORPORATION, Kanagawa (JP)

(72) Inventors: Yuki Hoshino, Kanagawa (JP); Yasushi Fujimura, Ibaraki (JP); Sho Fujimoto, Kanagawa (JP); Mototaka Kai, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 0 days.

(21) Appl. No.: 17/606,043

(22) PCT Filed: May 18, 2020

(86) PCT No.: PCT/JP2020/019690
§ 371 (c)(1),
(2) Date: Oct. 24, 2021

(87) PCT Pub. No.: WO2021/234792
PCT Pub. Date: Nov. 25, 2021

(65) Prior Publication Data
US 2022/0145482 A1    May 12, 2022

(51) Int. Cl.
  *C25B 15/02*    (2021.01)
  *C25B 15/08*    (2006.01)
  *C25B 1/04*     (2021.01)
  *G05B 19/418*   (2006.01)

(52) U.S. Cl.
  CPC ............... *C25B 15/02* (2013.01); *C25B 1/04* (2013.01); *C25B 15/081* (2021.01); *G05B 19/41885* (2013.01)

(58) Field of Classification Search
  CPC .......... C25B 1/04; C25B 15/02; C25B 15/081
  See application file for complete search history.

(56) References Cited

U.S. PATENT DOCUMENTS

| 10,626,513 B1 | 4/2020 | Li |
| 2017/0122129 A1* | 5/2017 | Heid ..................... F01K 3/02 |

FOREIGN PATENT DOCUMENTS

| JP | 2002180281 | 6/2002 |
| JP | 2019026858 | 2/2019 |
| WO | 2013099524 | 7/2013 |
| WO | 2018069993 | 4/2018 |

OTHER PUBLICATIONS

"International Search Report (Form PCT/ISA/210) of PCT/JP2020/019690," dated Aug. 11, 2020, pp. 1-3.
"International Preliminary Report on Patentability (Form PCT/IPEA/409) of PCT/JP2020/019690," completed on Jul. 16, 2021, with English translation thereof, pp. 1-24.
"Office Action of Gulf Cooperation Council Counterpart Application", dated Nov. 23, 2021, p. 1-p. 3.

* cited by examiner

*Primary Examiner* — Ciel P Contreras
(74) *Attorney, Agent, or Firm* — JCIPRNET

(57) ABSTRACT

The plant control method includes the following. Calculating a first reference amount to be supplied for an amount of hydrogen to be supplied to a second production device (40). Making a decision on whether or not the amount of remaining hydrogen in a storage device (20) at the beginning of a subject term falls within a reference range.

9 Claims, 11 Drawing Sheets

PARAMETER STORAGE UNIT

| REFERENCE RANGE FOR REMAINING AMOUNT IN STORAGE DEVICE | UPPER LIMIT | ×× [%] |
| --- | --- | --- |
| | LOWER LIMIT | ×× [%] |
| HYDROGEN CONSUMPTION PER TERM | UPPER LIMIT | ×××× [kg] |
| | LOWER LIMIT | ×××× [kg] |
| PLANT HALT CONDITION | AMOUNT OF REMAINING HYDROGEN IN STORAGE DEVICE | ×× [%] |

FIG. 3

PLANT CONTROL METHOD, PLANT CONTROL DEVICE, PROGRAM, AND PLANT

CROSS-REFERENCE TO RELATED APPLICATION

This application is a 371 application of the international PCT application serial no. PCT/JP2020/019690, filed on May 18, 2020. The entirety of the above-mentioned patent application is hereby incorporated by reference herein and made a part of this specification.

TECHNICAL FIELD

The present invention relates to a plant control method, a plant control device, a program, and a plant.

BACKGROUND ART

It is expected that variable renewable energy will find an increasing number of applications in the future. There may be an exemplary method for using the variable renewable energy including producing hydrogen using the variable renewable energy, at least temporarily storing the produced hydrogen, and using the stored hydrogen in a following step.

Patent Literature 1 describes an electrolysis system. The electrolysis system has an electric power generation device, an electric power distribution device, an electrolysis device, and a pressurization device. The electric power generation device generates electric power using renewable energy. The electric power distribution device distributes the generated electric power. The electrolysis device electrolyzes water using the distributed electric power. The pressurization device pressurizes hydrogen and oxygen produced by the electrolysis device using the distributed electric power (surplus electric power exceeding the power consumption of the electrolysis device).

It is disclosed in paragraph 0025 of Patent Literature 1 that a larger amount of hydrogen can be stored in the same storage space by compressing the hydrogen. In addition, it is discloses in paragraph 0049 that the pressurization of hydrogen produced by the electrolysis device is necessary in view of efficiency of transportation and storage of hydrogen. That is, a problem disclosed in Patent Literature 1 is spatial efficiency in storing the produced hydrogen.

CITATION LIST

Patent Literature

Patent Literature 1: JP 2019-026858 A

SUMMARY OF INVENTION

Technical Problem

The technique described in the above-described Patent Literature 1 intends to increase storage efficiency by merely compressing the produced hydrogen. Patent Literature 1 does not disclose any other method for increasing storage efficiency.

The present invention has been made in consideration of the above-described circumstances. That is, the present invention intends to provide a plant control method, a plant control device, a program, and a plant that can increase the efficiency of storing hydrogen by a means other than compressing hydrogen.

Solution to Problem

[1] To solve the above-described problem, a plant control method according to the present invention includes, for the purpose of controlling a plant that has a first production device for producing hydrogen by water electrolysis using electric power generated from variable renewable energy, a storage device for at least temporarily storing the hydrogen produced by the above-described first production device, and a second production device for producing a product using the hydrogen supplied from the above-described storage device as a raw material, calculating a first reference amount to be supplied that is used as a reference for calculating an amount of hydrogen to be supplied to the above-described second production device in a subject term; making a decision on whether or not an amount of remaining hydrogen in the above-described storage device at the beginning of the above-described subject term falls within a predetermined reference range; and (1) when the above-described amount of remaining hydrogen falls within the above-described reference range, performing control according to the above-described first reference amount to be supplied such that (1-a) when the above-described first reference amount to be supplied is, with respect to hydrogen consumption in the above-described second production device, an amount of a lower limit of consumption or more and an upper limit of consumption or less, the above-described first reference amount to be supplied is used as an amount of hydrogen to be supplied from the above-described storage device to the above-described second production device in the above-described subject term, or (2) when the above-described amount of remaining hydrogen does not fall within the above-described reference range, calculating a second reference amount to be supplied that is used as a reference of an amount of hydrogen to be supplied to the above-described second production device, the reference allowing the amount of remaining hydrogen in the above-described storage device at the end of the above-described subject term to fall within the above-described reference range, and performing control according to the above-described second reference amount to be supplied such that (2-a) when the above-described second reference amount to be supplied is, with respect to hydrogen consumption in the above-described second production device, an amount of a lower limit of consumption or more and an upper limit of consumption or less, the above-described second reference amount to be supplied is used as an amount of hydrogen to be supplied from the above-described storage device to the above-described second production device in the above-described subject term.

[2] Another aspect is the above-described plant control method including, in the above-described (1), (1-b) when the above-described first reference amount to be supplied is an amount of more than the above-described upper limit of consumption, performing control such that the above-described upper limit of consumption is used as an amount of hydrogen to be supplied from the above-described storage device to the above-described second production device in the above-described subject term, or (1-c) when the above-described first reference amount to be supplied is an amount of less than the above-described lower limit of consumption, performing control such that the above-described lower limit of consumption is used as an amount of hydrogen to be supplied from the above-described storage device to the above-described second production device in the above-described subject term.

[3] Another aspect is the above-described plant control method including, in the above-described (2), (2-b) when the above-described second reference amount to be supplied is an amount of more than the above-described upper limit of consumption, performing control such that the above-described upper limit of consumption is used as an amount of hydrogen to be supplied from the above-described storage device to the above-described second production device in the above-described subject term, or (2-c) when the above-described second reference amount to be supplied is an amount of less than the above-described lower limit of consumption, performing control such that the above-described lower limit of consumption is used as an amount of hydrogen to be supplied from the above-described storage device to the above-described second production device in the above-described subject term.

[4] Another aspect is the above-described plant control method including, in the above-described (2-c), in the case where the above-described lower limit of consumption is used as the amount of hydrogen to be supplied from the above-described storage device to the above-described second production device in the above-described subject term, when the amount of remaining hydrogen in the above-described storage device at the end of the above-described subject term falls below a halt reference amount that is smaller than the lower limit of the above-described reference range, performing control such that operation of the above-described second production device is halted.

[5] Another aspect is the above-described plant control method in which the above-described first reference amount to be supplied is calculated based on an amount of hydrogen actually produced by the above-described first production device in a reference term that is different from the above-described subject term.

[6] Another aspect is the above-described plant control method in which the above-described first reference amount to be supplied is calculated based on a predictive amount of the above-described variable renewable energy supplied to the above-described first production device in the above-described subject term.

[7] Another aspect is the above-described plant control method in which the above-described electric power derived from variable renewable energy is electric power produced by photovoltaic power generation, and the above-described first reference amount to be supplied is calculated based on a predictive amount of solar radiation in the above-described subject term; or the above-described electric power derived from variable renewable energy is electric power produced by wind electric power generation, and the above-described first reference amount to be supplied is calculated based on a predictive volume of air in the above-described subject term.

[8] One aspect is a plant control device configured to, for the purpose of controlling a plant that has a first production device for producing hydrogen by water electrolysis using electric power generated from variable renewable energy, a storage device for at least temporarily storing the hydrogen produced by the above-described first production device, and a second production device for producing a product using the hydrogen supplied from the above-described storage device as a raw material, calculate a first reference amount to be supplied that is used as a reference for calculating an amount of hydrogen to be supplied to the above-described second production device in a subject term; make a decision on whether or not the amount of remaining hydrogen in the above-described storage device at the beginning of the above-described subject term falls within a predetermined reference range; and (1) when the above-described amount of remaining hydrogen falls within the above-described reference range, perform control according to the above-described first reference amount to be supplied such that (1-a) when the above-described first reference amount to be supplied is, with respect to hydrogen consumption in the above-described second production device, an amount of a lower limit of consumption or more and an upper limit of consumption or less, the above-described first reference amount to be supplied is used as an amount of hydrogen to be supplied from the above-described storage device to the above-described second production device in the above-described subject term, or (2) when the above-described amount of remaining hydrogen does not fall within the above-described reference range, calculate a second reference amount to be supplied that is used as a reference of an amount of hydrogen to be supplied to the above-described second production device, the reference allowing the amount of remaining hydrogen in the above-described storage device at the end of the above-described subject term to fall within the above-described reference range, and perform control according to the above-described second reference amount to be supplied such that (2-a) when the above-described second reference amount to be supplied is, with respect to hydrogen consumption in the above-described second production device, an amount of a lower limit of consumption or more and an upper limit of consumption or less, the above-described second reference amount to be supplied is used as an amount of hydrogen to be supplied from the above-described storage device to the above-described second production device in the above-described subject term.

[9] One aspect is a program for operating a computer as the plant control device of the above-described [8].

[10] One aspect is a plant that has a first production device for producing hydrogen by water electrolysis using electric power generated from variable renewable energy, a storage device for at least temporarily storing the hydrogen produced by the above-described first production device, a second production device for producing a product using the hydrogen supplied from the above-described storage device as a raw material, and a plant control device, wherein the plant control device is configured to calculate a first reference amount to be supplied that is used as a reference for calculating an amount of hydrogen to be supplied to the above-described second production device in a subject term; make a decision on whether or not the amount of remaining hydrogen in the above-described storage device at the beginning of the above-described subject term falls within a predetermined reference range; and (1) when the above-described amount of remaining hydrogen falls within the above-described reference range, perform control according to the above-described first reference amount to be supplied such that (1-a) when the above-described first reference amount to be supplied is, with respect to hydrogen consumption in the above-described second production device, an amount of a lower limit of consumption or more and an upper limit of consumption or less, the above-described first reference amount to be supplied is used as an amount of hydrogen to be supplied from the above-described storage device to the above-described second production device in the above-described subject term, or (2) when the above-described amount of remaining hydrogen does not fall within the above-described reference range, calculate a second reference amount to be supplied that is used as a reference of an amount of hydrogen to be supplied to the above-described second production device, the reference allowing the amount of remaining hydrogen in the above-described storage device at the end of the above-described subject term to fall within the above-described reference range, and perform control according to the above-described second reference amount to be supplied such that (2-a) when the above-described second reference amount to be supplied is, with respect to hydrogen consumption in the above-described second production device, an amount of a lower limit of consumption or more and an upper limit of consumption or less, the above-described second reference amount to be supplied is used as an amount of hydrogen to be supplied from the above-described storage device to the above-described second production device in the above-described subject term.

Advantageous Effects of Invention

According to the present invention, the scale of a storage device can be minimized. Thus, the present invention is advantageous in terms of cost and the size of space occupied.

BRIEF DESCRIPTION OF DRAWINGS

FIG. 3 is a schematic illustration showing a data structure stored by a parameter storage unit of a plant control device in a first embodiment.

DESCRIPTION OF EMBODIMENTS

A plurality of embodiments will be described with reference to figures below.

First Embodiment

A first embodiment is described. First, a subject term and a reference term in this embodiment are described. The subject term is a term (period of time) in which a control is performed. For example, the subject term is a term having a length of 1 week or more and 3 months or less. For example, the subject term may be, but is not limited to, a term having a length of 2 days or more and 1 month or less, and preferably a length of 2 days or more and 2 weeks or less. The reference term is a term that is referenced for control. The reference term basically has a length that is the same as or similar to that of a subject term. For example, a reference term may be any of the following: a preceding term of the subject term, a past term in, for example, a season or a month that is the same as that of the subject term, a term having an environment that is similar (statistically correlative) to the environment (e.g., the amount of solar radiation) in the subject term, a statistically calculated hypothetical term (e.g., an average value of months of X over past N years, a value calculated from an average value of months of X over past N years and a value actually obtained in the preceding month of the current year, or the like).

Figure 1:
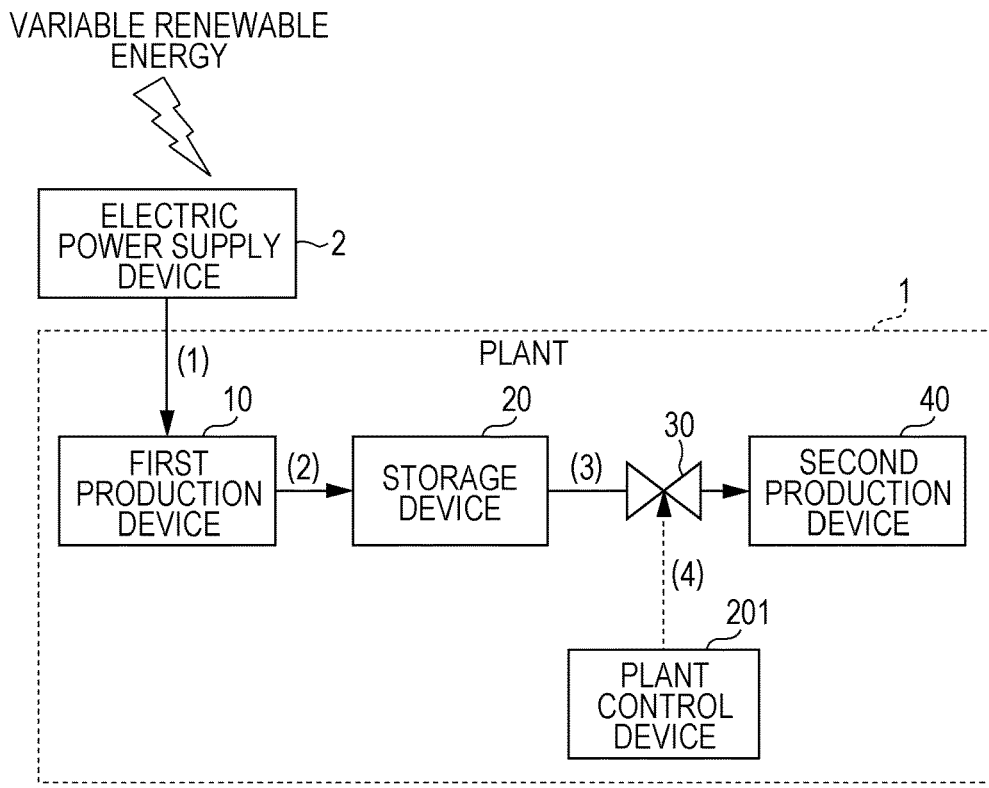
FIG. 1 is a block diagram showing a constitution of a plant according to a first embodiment.

FIG. 1 is a block diagram showing a constitution of a production plant according to a first embodiment. As shown in the figure, a plant 1 according to the present embodiment includes a first production device 10, a storage device 20, a flow control valve 30, a second production device 40, and a plant control device 201. The power supply device 2 supplies electric power at least to the first production device 10. Brief descriptions of these devices will be provided below.

The power supply device 2 supplies electric power generated using variable renewable energy to at least the first production device 10. The power supply device 2 may be a storage device that generates electric power using variable renewable energy. Alternatively, the power supply device 2 may be a device that receives electric power generated by another device using variable renewable energy and supplies the received electric power to the first production device 10.

The variable renewable energy is an energy that substantially varies in output depending on environmental conditions or the like. The variable renewable energy is also referred to as, for example, "natural renewables" or "renewables". Examples of the variable renewable energy include solar energy, wind energy, and tidal force energy. The variable renewable energy is used to generate electric power.

The first production device 10 produces hydrogen by water electrolysis using electric power supplied from at least the power supply device 2 (electric power generated from variable renewable energy). That is, the first production device 10 produces hydrogen ($H_2$) and oxygen ($O_2$) using water ($H_2O$) as a raw material. The hydrogen produced by the first production device 10 is delivered to a storage device 20 through a pipe or the like. The oxygen produced by the first production device 10 is delivered to another storage device (not shown) through a pipe or the like.

The storage device 20 at least temporarily stores the hydrogen produced by the above-described first production device 10. The storage device 20 is, for example, a tank for storing a gas or a liquefied gas. The storage device 20 is equipped with a measuring instrument for measuring the amount of hydrogen that remains in the device. A reference range for the amount stored in the storage device 20 will be described later. The reference range is represented by the lower limit and the upper limit (e.g., percentage) with respect to the amount stored in the storage device 20 for maintaining the operation of the plant.

The flow control valve 30 is a valve for controlling the flow rate. The flow control valve 30 is disposed on the route of, for example, a pipe for supplying hydrogen from the storage device 20 to the second production device 40. The flow control valve 30 is equipped with, for example, a mechanism that allows the aperture of the valve to be changed steplessly. The valve aperture of the flow control valve 30 can be changed by a control signal from the plant control device 201.

The second production device 40 is a device for producing a product using hydrogen supplied from the storage device 20 as a raw material. To the second production device 40, raw materials that are necessary for producing the product are also supplied in addition to hydrogen. The second production device 40 produces, for example, ammonia ($NH_3$) as a product using hydrogen and nitrogen as raw materials. The second production device 40 may be a device for producing other products. The second production device 40 produces, for example, methanol, organic hydrides, methane, carbon monoxide, light oil, and hydrogen peroxide in addition to ammonia. In any case, the second production device 40 consumes hydrogen supplied from the storage device 20 as one of the raw materials.

The plant control device 201 controls the production of a product by the plant 1. In particular, the plant control device 201 controls the amount of hydrogen supplied from the storage device 20 to the second production device 40 in each term (period of time). For this purpose, the plant control device 201 outputs a control signal for controlling the valve aperture of the flow control valve 30. The amount of hydrogen supplied from the flow control valve 30 is a time integral of the multiplication product of the above-described valve aperture and the speed of running hydrogen (the length of hydrogen current that flows per unit time). In other words, the amount of hydrogen supplied from the flow control valve 30 is a time integral of the flow rate (the flow rate depends on the valve aperture of the flow control valve 30) per unit time. The control may be performed by measuring the amount of actual hydrogen flow using a flow meter or the like, and feeding the measured flow rate back to the plant control device 201.

A single term has, for example, a length of 1 week or more and 3 months or less. The single term may have, for example, about 2 days or more and about 1 month or less, and preferably have a length of 2 days or more and 2 weeks or less. However, the length of a single term is not limited thereto. Continuous operation of a plant according to a fixed plan for a certain period of time may lead to an improved operation efficiency. When the length of a single term is too short, the plant operation efficiency declines. On the other hand, when the length of a single term is too long, environmental variations (variations in the amount of solar radiation or the like) during the term may be too large, for example. Thus, it becomes difficult to design a suitable operation plan. Accordingly, it is desired that the length of a single term is suitably determined in view of such circumstances.

In FIG. 1, the arrow marked with (1) refers to electric power that is supplied from the power supply device 2 to the first production device 10. The arrow marked with (2) refers to hydrogen that is produced by the first production device 10 and delivered to the storage device 20. The arrow marked with (3) refers to hydrogen that is supplied from the storage device 20 to the second production device 40 through the flow control valve 30. The arrow marked with (4) refers to a control signal for controlling the aperture of the flow control valve 30. That is, the control signal denoted by (4) is a signal for controlling the amount of hydrogen to be supplied from the storage device 20 to the second production device 40.

Figure 2:
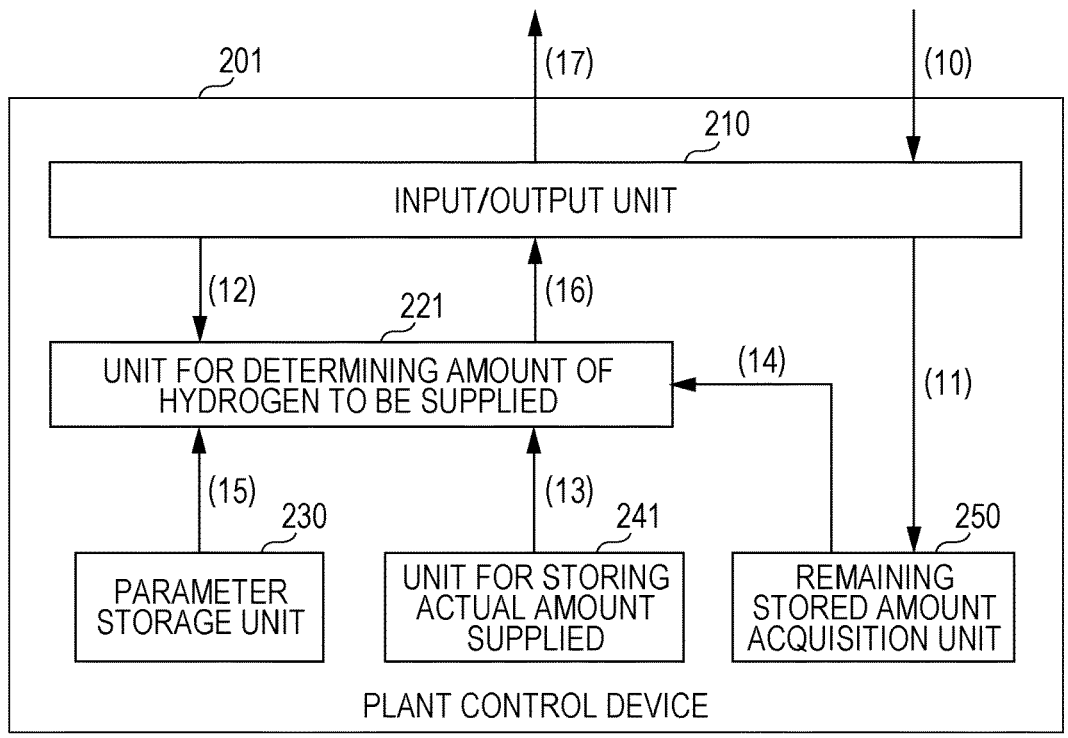
FIG. 2 is a block diagram schematically showing an internal functional constitution in a plant control device in a first embodiment.

FIG. 2 is a block diagram schematically showing an internal functional constitution of the plant control device 201. As shown in the figure, the plant control device 201 has a constitution including an input/output unit 210, a unit for determining the amount of hydrogen to be supplied 221, a parameter storage unit 230, a unit for storing the actual amount supplied 241, and a remaining stored amount acquisition unit 250. The plant control device 201 is realized using, for example, an electronic circuit. The plant control device 201 may be realized using a computer and a program. Each unit that constitutes the plant control device 201 may have a storage device, if necessary. The storage device may be realized using, for example, a semiconductor memory or a magnetic hard disk.

The input/output unit 210 inputs or outputs a signal. Specifically, the input/output unit 210 acquires a signal indicating the amount of hydrogen remaining in the storage device 20 from the outside, and delivers to the remaining stored amount acquisition unit 250. Also, the input/output unit 210 outputs a signal relating to the amount of hydrogen to be supplied that is delivered from the unit for determining the amount of hydrogen to be supplied 221 to the outside. The input/output unit 210 may further input or output other signals.

The unit for determining the amount of hydrogen to be supplied 221 determines the amount of hydrogen to be supplied to the second production device 40. The processing procedure for the unit for determining the amount of hydrogen to be supplied 221 to determine the amount of hydrogen to be supplied will be described with reference to a flow chart later. The unit for determining the amount of hydrogen to be supplied 221 acquires, for determining an amount of hydrogen to be supplied in a subject term, a data of the amount of hydrogen actually supplied in a different term (reference term) from the unit for storing the actual amount supplied 241. Also, the unit for determining the amount of hydrogen to be supplied 221 acquires information relating to the amount of hydrogen remaining in the storage device 20 from the remaining stored amount acquisition unit 250. Further, the unit for determining the amount of hydrogen to be supplied 221 reads values of a plurality of parameters that are necessary for determining the amount of hydrogen to be supplied from the parameter storage unit 230.

The unit for determining the amount of hydrogen to be supplied 221 outputs, after the determination of the amount of hydrogen to be supplied, a signal for controlling the flow control valve 30. Based on this signal, the plant control device 201 controls the amount of hydrogen to be supplied to the second production device 40. The unit for determining the amount of hydrogen to be supplied 221 may output a signal indicating a numerical value itself referring to the determined amount of hydrogen to be supplied. Alternatively, the unit for determining the amount of hydrogen to be supplied 221 may calculate the aperture of the flow control valve 30 based on the determined amount of hydrogen to be supplied, and output a signal indicating a numerical value that corresponds to the aperture.

In addition, a flow meter may be disposed on the flow pass of hydrogen and, for example, in the vicinity of the flow control valve 30, and an actual flow rate of hydrogen measured by this flow meter may be fed back to the unit for determining the amount of hydrogen to be supplied 221. In this case, the unit for determining the amount of hydrogen to be supplied 221 controls the aperture of the flow control valve 30 based on, for example, information relating to the actual flow rate that has been fed back thereto.

The parameter storage unit 230 stores a parameter that is necessary for the unit for determining the amount of hydrogen to be supplied 221 to determine an amount of hydrogen to be supplied. The parameter stored by the parameter storage unit 230 will be described with reference to a different figure later.

The unit for storing the actual amount supplied 241 stores a data relating to the amount of hydrogen actually supplied to the second production device 40 in a reference term that is different from the subject term, that is, a data relating to the amount of hydrogen actually consumed in the second production device 40 in the reference term. The unit for storing the actual amount supplied 241 stores, for example, a numerical value indicating the amount of hydrogen supplied in each term. Alternatively, the unit for storing the actual amount supplied 241 may store, for example, a statistical value (e.g., mean value) relating to amounts of hydrogen supplied in a plurality of terms.

The remaining stored amount acquisition unit 250 acquires a signal indicating the amount of hydrogen remaining in the storage device 20 from the outside (from the storage device 20). Also, the remaining stored amount acquisition unit 250 delivers a data relating to the amount of remaining hydrogen to the unit for determining the amount of hydrogen to be supplied 221.

The signal that is received or sent by each unit shown in FIG. 2 relates to the following. The arrows marked with (10) and (11) refer to a signal indicating the amount of hydrogen remaining in the storage device 20 acquired by the remaining stored amount acquisition unit 250 through the input/output unit 210. The arrow marked with (12) refers to a signal of requesting the amount of hydrogen to be supplied that is delivered from the input/output unit 210 to the unit for determining the amount of hydrogen to be supplied 221. The signal of requesting the amount of hydrogen to be supplied denoted by (12) may be a signal responding to a request from the outside of the plant control device 201. The arrow marked with (13) refers to information relating to the amount of hydrogen to be supplied in a defined term referenced by the unit for determining the amount of hydrogen to be supplied 221 to the unit for storing the actual amount supplied 241. The arrow marked with (14) refers to a signal indicating the amount of hydrogen remaining in the storage device 20 delivered from the remaining stored amount acquisition unit 250 to the unit for determining the amount of hydrogen to be supplied 221. The arrow marked with (15) refers to a signal indicating a value of a parameter read by the unit for determining the amount of hydrogen to be supplied 221 from the parameter storage unit 230. The arrows marked with (16) and (17) refer to a signal for controlling the aperture of the flow control valve 30 based on the amount of hydrogen to be supplied determined by the unit for determining the amount of hydrogen to be supplied 221. This signal for controlling the aperture of the flow control valve 30 is output through the input/output unit 210.

FIG. 3 is a schematic illustration showing a data structure stored by the parameter storage unit 230 of the plant control device 201. These parameters are set by, for example, an application program for setting the parameters operated by an administrator of the plant. As shown in the figure, the data stored by the parameter storage unit 230 includes a reference range for the remaining amount in a storage device, a hydrogen consumption per term, and a plant halt condition.

The reference range for the remaining amount in a storage device is a reference for the amount of hydrogen remaining in the storage device 20 during operation of the plant 1. The parameter storage unit 230 stores the lower limit and the upper limit (both in percentage with respect to the total capacity of the storage device 20) as the reference range for the remaining amount in a storage device. The operation is designed such that the amount of remaining hydrogen in the storage device 20 always falls within this range. For example, the reference range for the remaining amount in a storage device is determined based on a design pressure of the storage device 20. For example, when the design pressure of the storage device 20 (maximum hydrogen pressure) is 100%, the lower limit is 30% of the design pressure, and the upper limit is 70% of the design pressure. Also, the lower limit is not particularly limited and may be smaller than 30% of the design pressure, and the upper limit is not particularly limited and may be larger than 70% of the design pressure. The reference range for the remaining amount in a storage device may be determined based on, in addition to the design pressure of the storage device 20, the weight of hydrogen (e.g., in kilogram) in the storage device 20.

The hydrogen consumption per term is the amount of hydrogen consumed by the second production device 40 in a single term. The parameter storage unit 230 stores the upper limit and the lower limit of the hydrogen consumption (e.g., in unit of kilogram).

The plant halt condition is a reference value for the amount of hydrogen remaining in the storage device 20 (in percentage with respect to the total capacity of the storage device 20). When the amount of hydrogen remaining falls below the reference value, the plant control device 201 performs control for halting the operation of the plant 1.

Figure 4:
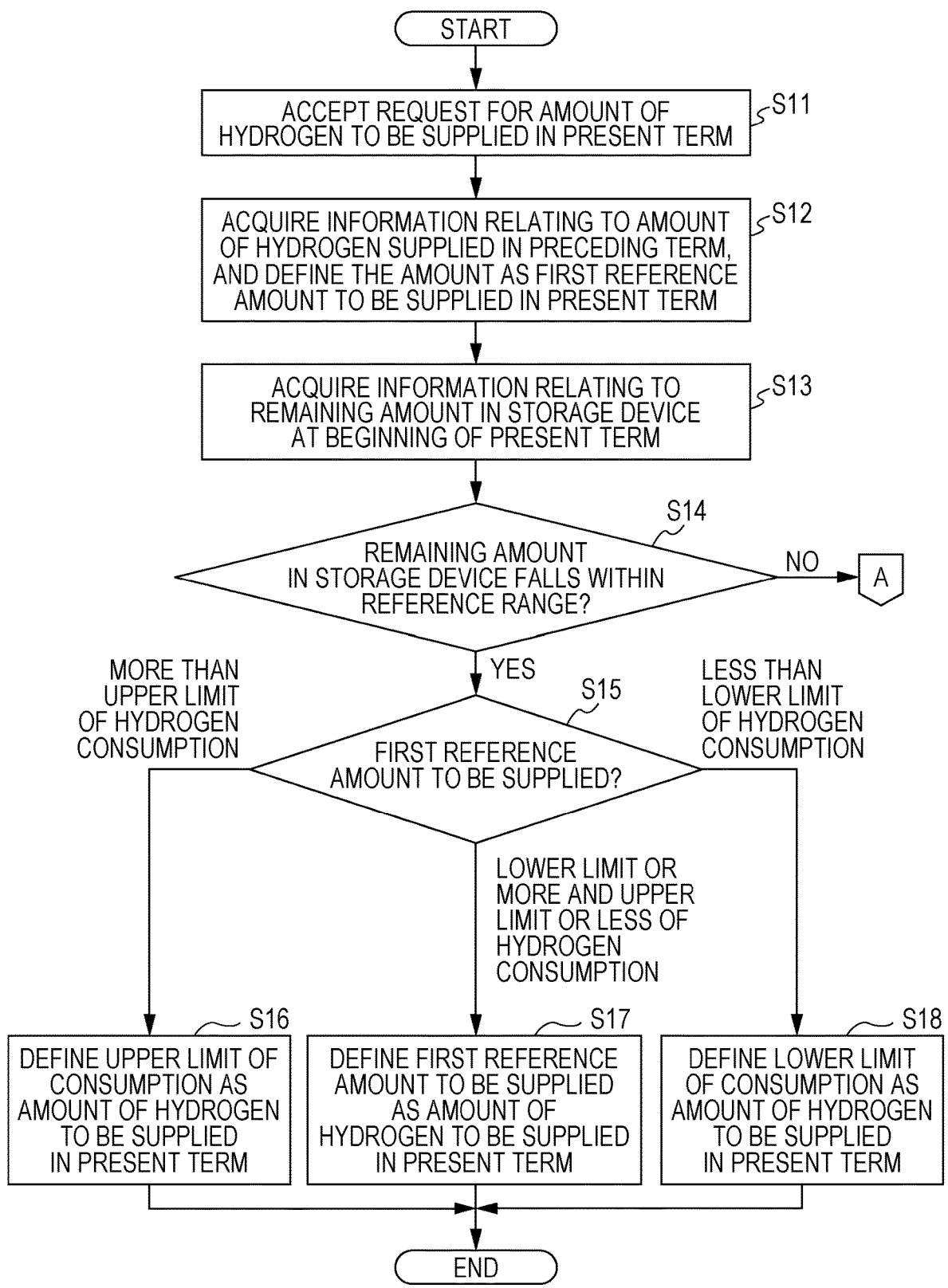
FIG. 4 is a flow chart (first part of 2-part chart) showing a processing procedure for a unit for determining the amount of hydrogen to be supplied to determine an amount of hydrogen to be supplied in a first embodiment.
Figure 5:
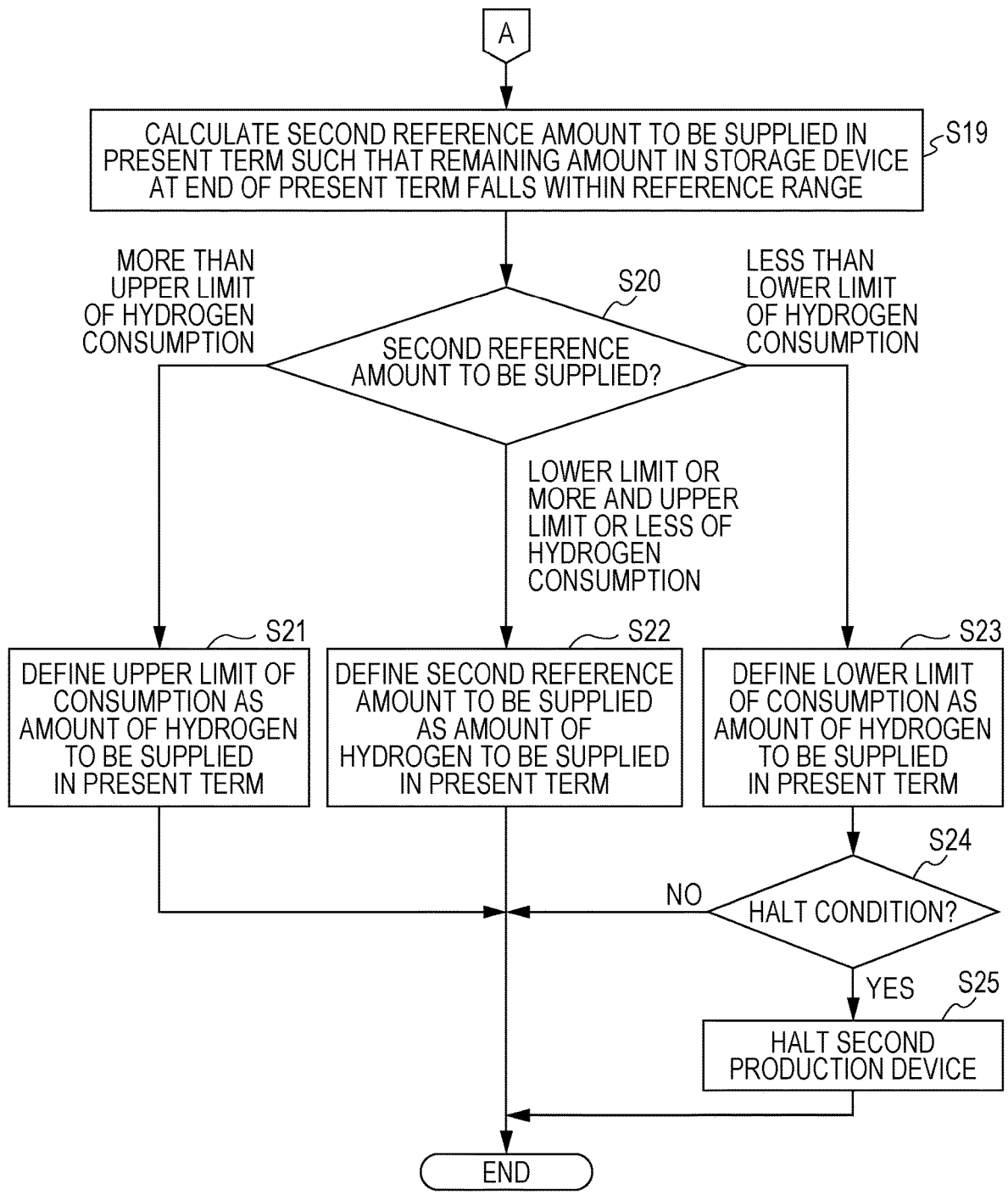
FIG. 5 is a flow chart (second part of 2-part chart) showing a processing procedure for a unit for determining the amount of hydrogen to be supplied to determine an amount of hydrogen to be supplied in a first embodiment.

FIG. 4 and FIG. 5 are flow charts showing a processing procedure for the unit for determining the amount of hydrogen to be supplied 221 to determine the amount of hydrogen to be supplied. FIG. 4 and FIG. 5 are connected with each other by a connector denoted by "A". In the processing shown in the flow chart, the "present term" is a subject term in which the plant control device 201 performs control. In other words, the "present term" is a term at present, or a term that is going to start shortly. The "preceding term" is a reference term that is referenced for determining the amount of hydrogen to be supplied in the present term. The following description is provided with reference to this flow chart.

In step S11 in FIG. 4, the unit for determining the amount of hydrogen to be supplied 221 of the plant control device 201 accepts a request for the amount of hydrogen to be supplied in the present term. Responding to this request, the unit for determining the amount of hydrogen to be supplied 221 calculates the amount of hydrogen to be supplied in the following steps.

In step S12, the unit for determining the amount of hydrogen to be supplied 221 acquires information relating to the amount of hydrogen actually supplied in the preceding term (hydrogen consumption in the second production device 40) from the unit for storing the actual amount supplied 241. The unit for determining the amount of hydrogen to be supplied 221 defines the amount of hydrogen supplied in the preceding term as a first reference amount to be supplied.

In step S13, the unit for determining the amount of hydrogen to be supplied 221 acquires information relating to the remaining amount in the storage device 20 at the beginning of the present term from the remaining stored amount acquisition unit 250. For example, when the present point in time is before the beginning of the present term yet, the unit for determining the amount of hydrogen to be supplied 221 may estimate the remaining amount in the storage device at the beginning of the present term based on the recent chronological change in the remaining amount acquired from the remaining stored amount acquisition unit 250.

In step S14, the unit for determining the amount of hydrogen to be supplied 221 makes a decision on whether or not the remaining amount in the storage device 20 at the beginning of the present term obtained in step S13 falls within the reference range. Specifically, the unit for determining the amount of hydrogen to be supplied 221 reads the reference range for the remaining amount in the storage device, that is, reads values in percentage of both the lower limit and the upper limit, from the parameter storage unit 230. Then, the unit for determining the amount of hydrogen to be supplied 221 calculates percentage of the remaining amount by dividing the remaining amount by the volume of the storage device 20. When the remaining amount falls within the reference range, the remaining amount is, with respect to the reference range for the remaining amount in the storage device, an amount of the lower limit or more and the upper limit or less. When the remaining amount falls within reference range (the remaining amount is an amount of the lower limit or more and the upper limit or less, YES in step S14), the processing advances to step S15. When the remaining amount does not fall within the reference range (the remaining amount is an amount of less than the lower limit, or more than the upper limit, NO in step S14), the processing advances to step S19 in FIG. 5.

In step S15, the unit for determining the amount of hydrogen to be supplied 221 makes a decision on the value of the first reference amount to be supplied that has been determined in step S12, and the processing procedure branches. The unit for determining the amount of hydrogen to be supplied 221 reads the upper limit and the lower limit of the hydrogen consumption in the second production device 40 per term from the parameter storage unit 230. When the first reference amount to be supplied is an amount of more than the upper limit of the hydrogen consumption, the processing advances to step S16. When the first reference amount to be supplied is an amount of the lower limit or more and the upper limit or less of the hydrogen consumption, the processing advances to step S17. When the first reference amount to be supplied is an amount of less than the lower limit of the hydrogen consumption, the processing advances to step S18.

When the processing advances to step S16, the unit for determining the amount of hydrogen to be supplied 221 defines the upper limit of the above-described amount of hydrogen consumption as a hydrogen consumption in the present term. Then, the unit for determining the amount of hydrogen to be supplied 221 terminates all processing in this flow chart. The plant control device 201 outputs a signal for controlling the aperture of the flow control valve 30 such that hydrogen is supplied to the second production device 40 in the amount defined above as a hydrogen consumption.

When the processing advances to step S17, the unit for determining the amount of hydrogen to be supplied 221 defines the above-described first reference amount to be supplied as a hydrogen consumption in the present term. Then, the unit for determining the amount of hydrogen to be supplied 221 terminates all processing in this flow chart. The plant control device 201 outputs a signal for controlling the aperture of the flow control valve 30 such that hydrogen is supplied to the second production device 40 in the amount defined above as a hydrogen consumption.

When the processing advances to step S18, the unit for determining the amount of hydrogen to be supplied 221 defines the lower limit of the above-described amount of hydrogen consumption as a hydrogen consumption in the present term. Then, the unit for determining the amount of hydrogen to be supplied 221 terminates all processing in this flow chart. The plant control device 201 outputs a signal for controlling the aperture of the flow control valve 30 such that hydrogen is supplied to the second production device 40 in the amount defined above as a hydrogen consumption.

Alternatively, when the processing advances to step S19 in FIG. 5, in step S19, the unit for determining the amount of hydrogen to be supplied 221 calculates a second reference amount to be supplied in the present term such that the remaining amount in the storage device 20 at the end of the present term falls within the above-described reference range.

A specific example of the method for calculating the second reference amount to be supplied is as follows. The remaining amount in the storage device 20 at the beginning of the present term (acquired in step S13) is denoted by RP (e.g., in unit of kilogram). The above-described first reference amount to be supplied (defined in step S12) is denoted by C1 (also, in unit of kilogram). This C1 can be construed as an approximate amount of the amount of hydrogen produced in the present term. The amounts corresponding to the lower limit and the upper limit of the reference range of the storage device 20 (values read from the parameter storage unit 230 in step S14, shown in percentage) are denoted by LL and LH (in unit of kilogram), respectively. The second reference amount to be supplied (denoted by C2, in unit of kilogram) can be calculated as follows. That is, C2 that satisfies the following formula (1) is calculated.

$$LL \le (RP + C1 - C2) \le LH \tag{1}$$

As described above, the values of RP, C1, LL, and LH are already-known values. When the formula (1) is solved for C2, the following formula (2) is obtained. That is, it is sufficient for the unit for determining the amount of hydrogen to be supplied 221 to determine one value of C2 that satisfies the formula (2).

$$(RP + C1 - LH) \le C2 \le (RP + C1 - LL) \tag{2}$$

To increase the possibility that the formula (2) holds even when the actual amount of hydrogen produced in the present term is shifted from C1, the unit for determining the amount of hydrogen to be supplied 221 determines, for example, the value of C2 as a value that is represented by the following formula (3) or a value near this value.

$$C2 = (RP + C1) - (LH + LL)/2 \quad (3)$$

The value of C2 represented by formula (3) is, in other words, a second reference amount to be supplied that is defined in view of the median of the reference range of the storage device 20 as a target.

Alternatively, the unit for determining the amount of hydrogen to be supplied 221 may determine the second reference amount to be supplied by a method other than the method exemplified above.

In step S20, the unit for determining the amount of hydrogen to be supplied 221 makes a decision on the value of the second reference amount to be supplied that has been determined in step S19, and the processing procedure branches. The upper limit and the lower limit of the hydrogen consumption in the second production device 40 per term are, as described in step S15, read from the parameter storage unit 230. When the second reference amount to be supplied is an amount of more than the upper limit of the hydrogen consumption, the processing advances to step S21. When the second reference amount to be supplied is an amount of the lower limit or more and the upper limit or less of the hydrogen consumption, the processing advances to step S22. When the second reference amount to be supplied is an amount of less than the lower limit of the hydrogen consumption, the processing advances to step S23.

When the processing advances to step S21, the unit for determining the amount of hydrogen to be supplied 221 defines the upper limit of the above-described amount of hydrogen consumption as a hydrogen consumption in the present term. Then, the unit for determining the amount of hydrogen to be supplied 221 terminates all processing in this flow chart. The plant control device 201 outputs a signal for controlling the aperture of the flow control valve 30 such that hydrogen is supplied to the second production device 40 in the amount defined above as a hydrogen consumption.

When the processing advances to step S22, the unit for determining the amount of hydrogen to be supplied 221 defines the above-described second reference amount to be supplied as a hydrogen consumption in the present term. Then, the unit for determining the amount of hydrogen to be supplied 221 terminates all processing in this flow chart. The plant control device 201 outputs a signal for controlling the aperture of the flow control valve 30 such that hydrogen is supplied to the second production device 40 in the amount defined above as a hydrogen consumption.

When the processing advances to step S23, the unit for determining the amount of hydrogen to be supplied 221 defines the lower limit of the above-described amount of hydrogen consumption as a hydrogen consumption in the present term. After step S23, in step S24, the unit for determining the amount of hydrogen to be supplied 221 makes a decision on whether or not the halt condition is satisfied. This decision about the halt condition is a decision on whether or not the remaining amount in the storage device 20 at the end of the present term falls below the minimum reference value with respect to halt of plant (the value shown as the amount of remaining hydrogen in the "plant halt condition" in FIG. 3) if the hydrogen consumption defined in step S23 is realized. When the remaining amount in storage device 20 at the end of the present term falls below the minimum reference value with respect to halt of plant (YES in step S24), the processing advances to step S25. When the remaining amount in the storage device 20 at the end of the present term does not fall below the minimum reference value with respect to halt of plant (NO in step S24), the unit for determining the amount of hydrogen to be supplied 221 terminates all processing in this flow chart. The plant control device 201 outputs a signal for controlling the aperture of the flow control valve 30 such that hydrogen is supplied to the second production device 40 in the amount defined above as a hydrogen consumption.

When the processing advances to step S25, that is, when the plant halt condition is satisfied in the decision in step S24, the plant control device 201 outputs a signal indicating that the operation of the second production device 40 should be halted. That is, the hydrogen consumption in the present term defined in step S23 is invalidated. By performing the processing of step S25, a control for preventing the amount stored in the storage device 20 from falling below the minimum reference amount, which is caused by the operation of the second production device 40, can be performed automatically.

Next, the control method according to the first embodiment is summarized, and modified examples thereof are described.

As described above, in the first embodiment, the first production device 10 produces hydrogen by water electrolysis using electric power generated from variable renewable energy. The amount of the electric power supplied is not always constant, but varies. The storage device 20 at least temporarily stores hydrogen produced by the first production device 10. The second production device 40 produces a product using the hydrogen supplied from the storage device 20 as a raw material. The plant control device 201 uses the following plant control method. That is, the plant control device 201 calculates a first reference amount to be supplied that is used as a reference for calculating an amount of hydrogen to be supplied to the second production device 40 in a subject term. Also, the plant control device 201 makes a decision on whether or not the amount of remaining hydrogen in the storage device 20 at the beginning of the subject term falls within a predetermined reference range. When the amount of remaining hydrogen falls within the reference range, the plant control device 201 performs control such that when the first reference amount to be supplied is, with respect to hydrogen consumption in the second production device 40, an amount of a lower limit of consumption or more and an upper limit of consumption or less, the first reference amount to be supplied is used as an amount of hydrogen to be supplied from the storage device 20 to the second production device 40 in the subject term. When the amount of remaining hydrogen does not fall within the reference range, the plant control device 201 calculates a second reference amount to be supplied that is used as a reference of an amount of hydrogen to be supplied to the second production device 40, the reference allowing the amount of remaining hydrogen in the storage device 20 at the end of the subject term to fall within the reference range. The plant control device 201 performs control such that when the second reference amount to be supplied is, with respect to hydrogen consumption in the second production device 40, an amount of a lower limit of consumption or more and an upper limit of consumption or less, the second reference amount to be supplied is used as an amount of hydrogen to be supplied from the storage device 20 to the second production device 40 in the subject term. The plant control device 201 controls the amount of hydrogen to be supplied to the second production device 40 by controlling the aperture of the flow control valve 30.

Also, in the first embodiment, the plant control device 201 may perform control such that (1-b) when the first reference amount to be supplied is an amount of more than the upper limit of consumption in the second production device 40, the upper limit of consumption is used as an amount of hydrogen to be supplied from the storage device 20 to the second production device 40 in the subject term. Also, the plant control device 201 may perform control such that (1-c) when the first reference amount to be supplied is an amount of less than the lower limit of consumption in the second production device 40, the lower limit of consumption is used as an amount of hydrogen to be supplied from the storage device 20 to the second production device 40 in the subject term.

As a modified example of the first embodiment, the plant control device 201 may perform control by a different method such that (1-b) when the first reference amount to be supplied is an amount of more than the upper limit of consumption in the second production device 40 as described above, a certain amount is used as an amount of hydrogen to be supplied from the storage device 20 to the second production device 40 in the subject term. Also, the plant control device 201 may perform control by a different method such that (1-c) when the first reference amount to be supplied is an amount of less than the lower limit of consumption in the second production device 40 as described above, a certain amount is used as an amount of hydrogen to be supplied from the storage device 20 to the second production device 40 in the subject term. An example of the "different method" is a method in which the plant control device 201 determines the amount of hydrogen to be supplied from the storage device 20 to the second production device 40 based on an operation performed by an operator.

In the first embodiment, the plant control device 201 may perform control such that (2-b) when the second reference amount to be supplied is an amount of more than the upper limit of consumption in the second production device 40, the upper limit of consumption is used as the amount of hydrogen to be supplied from the storage device 20 to the second production device 40 in the subject term. Also, the plant control device 201 may perform control such that (2-c) when the second reference amount to be supplied is an amount of less than the lower limit of consumption in the second production device 40, the lower limit of consumption is used as an amount of hydrogen to be supplied from the storage device 20 to the second production device 40 in the subject term.

As a modified example of the first embodiment, the plant control device 201 may perform control by a different method such that (2-b) when the second reference amount to be supplied is an amount of more than the upper limit of consumption in the second production device 40 as described above, a certain amount is used as an amount of hydrogen to be supplied from the storage device 20 to the second production device 40 in the subject term. Also, the plant control device 201 may perform control by a different method such that (2-c) when the second reference amount to be supplied is an amount of less than the lower limit of consumption in the second production device 40 as described above, a certain amount is used as an amount of hydrogen to be supplied from the storage device 20 to the second production device 40 in the subject term. An example of the "different method" is a method in which the plant control device 201 determines the amount of hydrogen to be supplied from the storage device 20 to the second production device 40 based on an operation performed by an operator.

In the first embodiment, in the above-described (2-c), the following is also possible. That is, in the case where the lower limit of consumption in the second production device 40 is used as an amount of hydrogen to be supplied from the storage device 20 to the second production device 40 in the subject term, the plant control device 201 may perform control such that when the amount of remaining hydrogen in the storage device 20 at the end of the subject term falls below a halt reference amount that is even smaller than the lower limit of the reference range, that is, when the halt condition is satisfied, the operation of the second production device 40 is halted. In this case, the plant control device 201 outputs a signal suitable for halting the operation of the second production device 40.

As a modified method of the first embodiment, in the above-described (2-c), in the case where the lower limit of consumption in the second production device 40 is used as an amount of hydrogen to be supplied from the storage device 20 to the second production device 40 in the subject term, the plant control device 201 may perform control by a different method when the amount of remaining hydrogen in the storage device 20 at the end of the subject term falls below a halt reference amount that is even smaller than the lower limit of the reference range. An example of the "different method" is a method in which the plant control device 201 determines whether the operation of the second production device 40 is halted or continued based on an operation performed by an operator.

In the first embodiment, the first reference amount to be supplied may be calculated based on an amount of hydrogen actually produced by the first production device 10 in a reference term that is different from the subject term. For example, the first reference amount to be supplied may be considered as an amount of hydrogen actually produced by the first production device 10 in a preceding term (reference term).

Second Embodiment

Next, a second embodiment is described. It should be noted that if a matter is already described in the first embodiment, description of the matter may be omitted in the following description. The following description will be focused on matters unique to the second embodiment.

Characteristics of the second embodiment are as follows. That is, the characteristic of the unit for determining the amount of hydrogen to be supplied of a plant control device of the present embodiment is that a predictive amount of hydrogen production in the present term (subject term) predicted based on a predetermined condition is defined as the first reference amount to be supplied. The constitution of a plant in the present embodiment is similar to that of the first embodiment (FIG. 1). However, in the second embodiment, a plant control device 202 controls the plant instead of the plant control device 201 in the first embodiment. In the second embodiment, the subject term is also referred to as a "present term" (a term at present, or a term that is going to start shortly).

Figure 6:
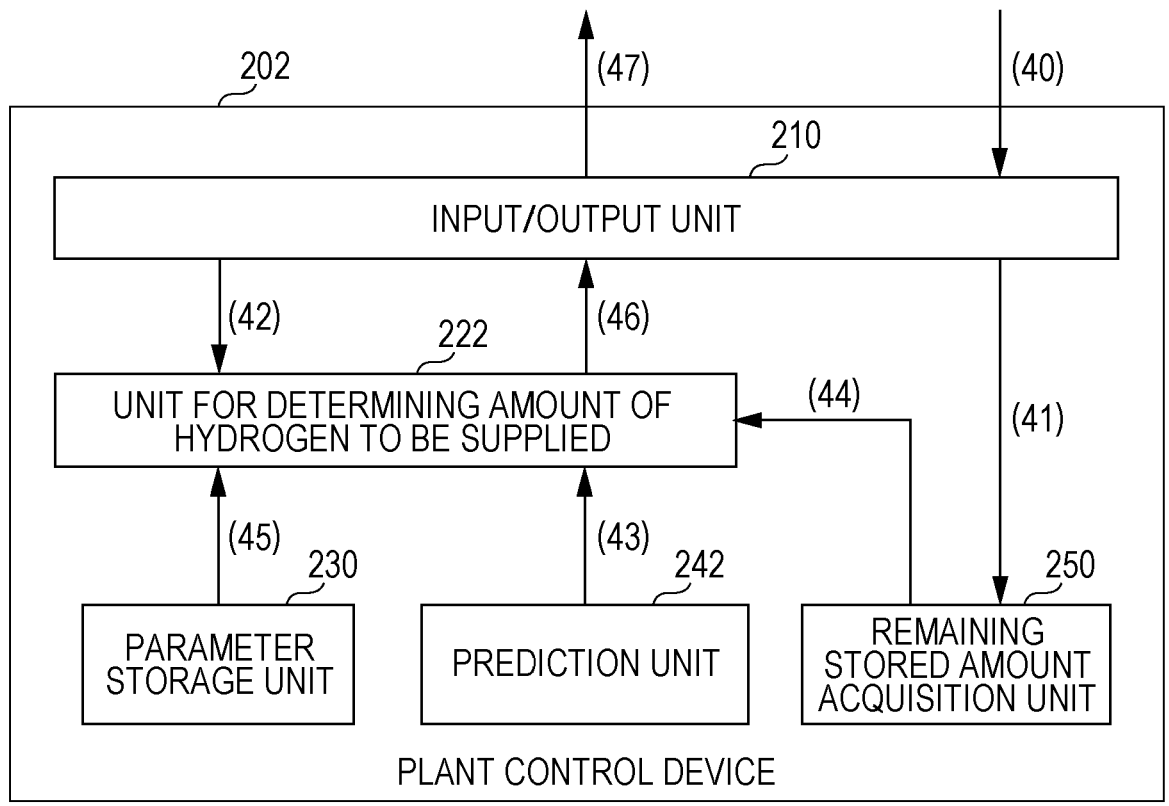
FIG. 6 is a block diagram schematically showing an internal functional constitution in a plant control device in a second embodiment.

FIG. 6 is a block diagram schematically showing an internal functional constitution of the plant control device 202. As shown in the figure, the plant control device 202 has a constitution including an input/output unit 210, a unit for determining the amount of hydrogen to be supplied 222, a parameter storage unit 230, a prediction unit 242, and a remaining stored amount acquisition unit 250. The plant control device 202 is also realized using, for example, an electronic circuit as in the plant control device 201. The plant control device 202 may be realized using a computer and a program.

The input/output unit 210, the parameter storage unit 230, and the remaining stored amount acquisition unit 250 have the same functions as those of the corresponding units in the first embodiment. Therefore, separate descriptions regarding the functions of these units are omitted.

The unit for determining the amount of hydrogen to be supplied 222 determines the amount of hydrogen to be supplied to the second production device 40 by a method specific to the present embodiment. The processing procedure for the unit for determining the amount of hydrogen to be supplied 222 to determine the amount of hydrogen to be supplied will be described with reference to a flow chart later. The unit for determining the amount of hydrogen to be supplied 222 acquires, for determining an amount of hydrogen to be supplied in a subject term, a predictive data of the amount of hydrogen supplied in the present term (subject term) from the prediction unit 242. Also, the unit for determining the amount of hydrogen to be supplied 222 acquires information relating to the amount of hydrogen remaining in the storage device 20 from the remaining stored amount acquisition unit 250. Further, the unit for determining the amount of hydrogen to be supplied 222 reads values of a plurality of parameters that are necessary for determining the amount of hydrogen to be supplied from the parameter storage unit 230.

The unit for determining the amount of hydrogen to be supplied 222 outputs, after the determination of the amount of hydrogen to be supplied, a signal for controlling the flow control valve 30. Based on this signal, the plant control device 202 controls the amount of hydrogen to be supplied to the second production device 40. The unit for determining the amount of hydrogen to be supplied 222 may output a signal indicating a numerical value itself referring to the determined amount of hydrogen to be supplied. Alternatively, the unit for determining the amount of hydrogen to be supplied 222 may calculate the aperture of the flow control valve 30 based on the determined amount of hydrogen to be supplied, and output a signal indicating a numerical value corresponding to the aperture.

The prediction unit 242 predicts the amount of hydrogen that may be supplied to the second production device 40 in the subject term. For example, the prediction unit 242 acquires a data relating to environmental conditions (referred to as "condition data"), and predicts the amount of energy (the amount of electric power) supplied to the first production device 10 based on the condition data. Also, the prediction unit 242 predicts the amount of hydrogen produced by the first production device 10 in the subject term based on the predicted amount of energy. An example of the case in which electric power produced by photovoltaic power generation is supplied to the first production device 10 will be described with reference to a flow chart later. Even when energy other than solar energy is used, the prediction unit 242 predicts the amount of energy (amount of electric power) supplied to the first production device 10, and predicts the amount of hydrogen produced by the first production device 10 in the subject term. For example, when wind energy is used instead of solar energy, the prediction unit 242 predicts the amount of energy (the amount of electric power produced by wind electric power generation) supplied to the first production device 10 based on a predictive volume of air, and further predicts the amount of hydrogen produced by the first production device 10 in the subject term.

The signal that is received or sent by each unit shown in FIG. 6 relates to the following. The arrows marked with (40) and (41) refer to a signal indicating the amount of hydrogen remaining in the storage device 20 acquired by the remaining stored amount acquisition unit 250 through the input/output unit 210. The arrow marked with (42) refers to a signal of requesting the amount of hydrogen to be supplied that is delivered from the input/output unit 210 to the unit for determining the amount of hydrogen to be supplied 222. The signal of requesting the amount of hydrogen to be supplied denoted by (42) may be a signal responding to a request from the outside of the plant control device 202. The arrow marked with (43) refers to a predictive value of the amount of hydrogen produced in the subject term that is acquired by the unit for determining the amount of hydrogen to be supplied 222 from the prediction unit 242. The arrow marked with (44) refers to a signal indicating the amount of hydrogen remaining in the storage device 20 delivered by the remaining stored amount acquisition unit 250 to the unit for determining the amount of hydrogen to be supplied 222. The arrow marked with (45) refers to a signal indicating a value of a parameter read by the unit for determining the amount of hydrogen to be supplied 222 from the parameter storage unit 230. The arrows marked with (46) and (47) refer to a signal for controlling the aperture of the flow control valve 30 based on the amount of hydrogen to be supplied determined by the unit for determining the amount of hydrogen to be supplied 222. This signal for controlling the aperture of the flow control valve 30 is output through the input/output unit 210.

In the present embodiment, types of parameters stored by the parameter storage unit 230 are the same as those in the first embodiment. That is, types of the parameters stored by the parameter storage unit 230 are the same as those described with reference to FIG. 3, and will not be described here.

Figure 7:
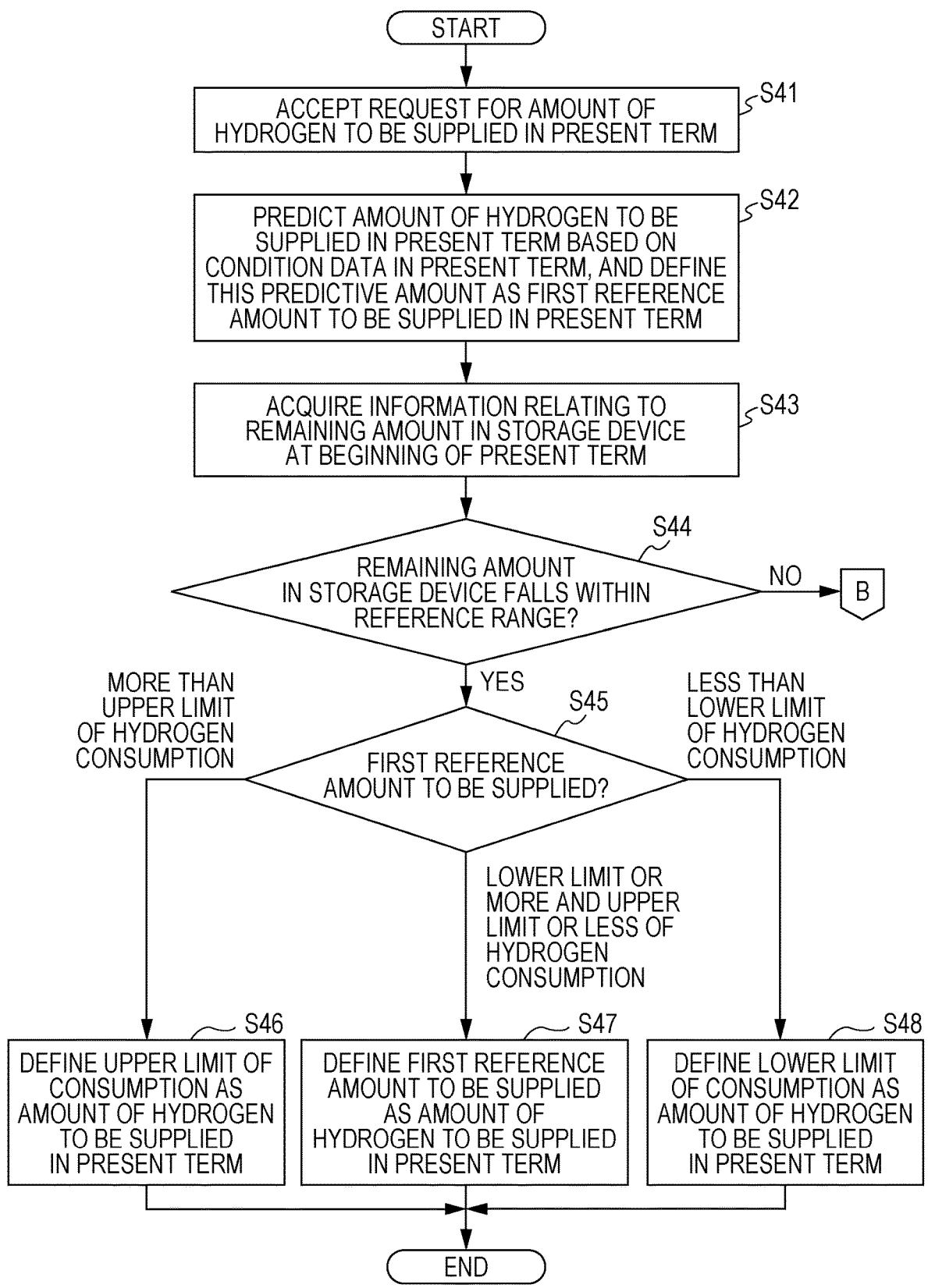
FIG. 7 is a flow chart (first part of 2-part chart) showing a processing procedure for a unit for determining the amount of hydrogen to be supplied to determine an amount of hydrogen to be supplied in a second embodiment.
Figure 8:
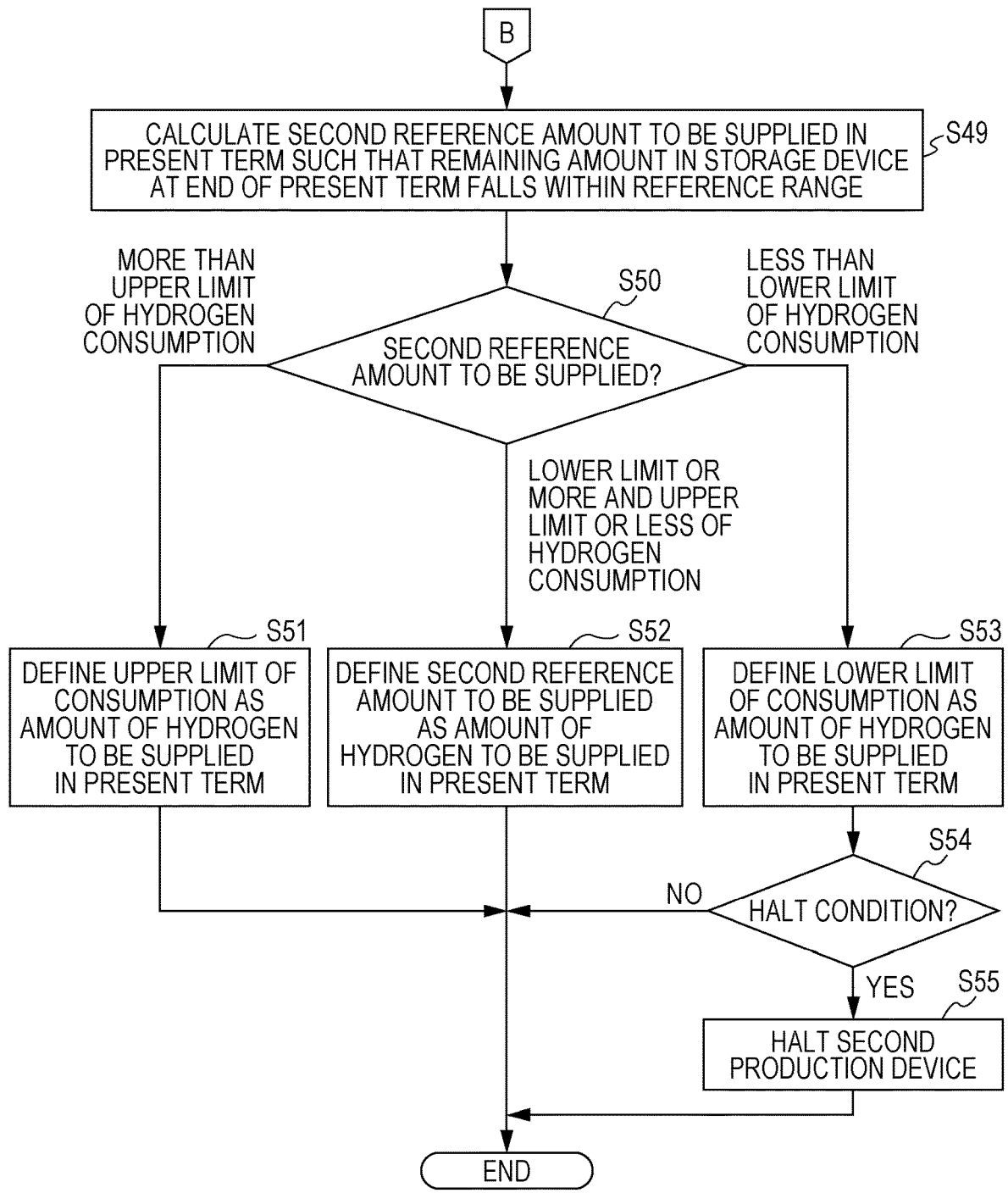
FIG. 8 is a flow chart (second part of 2-part chart) showing a processing procedure for a unit for determining the amount of hydrogen to be supplied to determine an amount of hydrogen to be supplied in a second embodiment.

FIG. 7 and FIG. 8 are flow charts showing a processing procedure for the unit for determining the amount of hydrogen to be supplied 222 to determine the amount of hydrogen to be supplied. FIG. 7 and FIG. 8 are connected with each other by a connector denoted by "B". In the processing shown in the flow chart, the "present term" is a subject term in which the plant control device 202 performs control. The following description is provided with reference to this flow chart.

In step S41 in FIG. 7, the unit for determining the amount of hydrogen to be supplied 222 of the plant control device 202 accepts a request for the amount of hydrogen to be supplied in the present term. Responding to the request, the unit for determining the amount of hydrogen to be supplied 222 calculates the amount of hydrogen to be supplied in the following steps.

In step S42, the prediction unit 242 predicts a suppliable amount of hydrogen in the present term. The prediction unit 242 can acquire a necessary condition data for predicting the suppliable amount of hydrogen from, for example, the outside through the Internet. The condition data is, for example, a long-range weather forecast at a location where the photovoltaic power generation facility is established. This data of the long-range weather forecast can be used for speculating the total amount of solar radiation in the present term. The condition data acquired and used by the prediction unit 242 is not limited to the data of weather forecast. The condition data is a data used for predicting the amount of electric power supplied by the power supply device 2 depending on the variable renewable energy. The unit for determining the amount of hydrogen to be supplied 222 acquires a data relating to a predictive value of the suppliable amount of hydrogen in the present term from the prediction unit 242. The unit for determining the amount of hydrogen to be supplied 222 defines this predictive value as a first reference amount to be supplied.

In addition, when the electric power is provided by using a method other than photovoltaic power generation (e.g., when provided by wind electric power generation or tidal force electric power generation), the prediction unit 242 also predicts a suppliable amount of hydrogen in the present term based on a meteorological data or other necessary data (these are "condition data").

Processing after the first reference amount to be supplied is defined, that is, processing in and after step S43 is the same as that in the first embodiment. That is, processing in each of the steps from step S43 to step S55 shown in FIG. 7 and FIG. 8 is the same as the processing in each of the steps from step S13 to step S25 shown in FIG. 4 and FIG. 5. Therefore, detailed descriptions regarding processing in each of the steps from step S43 to step S55 are omitted.

As described above, the plant control device 202 in the second embodiment exerts functions and produces effects that are partially the same as those of the plant control device 201 (including modifications thereof) in the first embodiment.

In the second embodiment, the first reference amount to be supplied may be calculated based on a predictive amount of the variable renewable energy supplied to the first production device 10 in the subject term.

In the second embodiment, the electric power derived from variable renewable energy may be electric power produced by photovoltaic power generation. In this case, the first reference amount to be supplied may be calculated based on, for example, the predictive amount of solar radiation in the subject term. Alternatively, the electric power derived from variable renewable energy may be electric power produced by wind electric power generation. In this case, the first reference amount to be supplied may be calculated based on, for example, a predictive volume of air in the subject term.

At least a part of the functions of the plant control device in the above-described embodiments (including modifications thereof) can be realized by a computer. In this case, the function may be realized by storing a program for realizing the functions in a computer readable storage medium, and allowing the program stored in the storage medium to be read and executed by a computer system. Herein, the term "computer system" includes OS and hardware such as a peripheral device. The term "computer readable storage medium" refers to portable media such as a flexible disk, a magneto-optical disk, ROM, CD-ROM, DVD-ROM, and a USB flash drive; and a storage device built in a computer system, such as a hard disk. The term "computer readable storage medium" may include media that temporarily and dynamically retain a program, including a network such as the Internet or a communication path that is used when the program is transmitted through a communication line such as a telephone line, and may also include media that retain a program for a certain period of time, such as an internal volatile memory in a computer system that acts as a server or a client used when the program is transmitted through the foregoing network or communication path. The above-described program may be a program for realizing a part of the above-described functions, or a program that can realize the above-described functions in combination with a program that has already been stored in the computer system.

According to any one of the above-described embodiments (or modifications thereof), the plant control device controls the amount of hydrogen supplied to the second production device such that the amount of hydrogen consumed in the second production device corresponds to the amount of hydrogen produced in the first production device. Accordingly, buffering variation in a storage device is reduced. Thus, the scale of a storage device (e.g., tank) can be minimized. Consequently, the cost of production and operation of a plant becomes advantageous. Furthermore, the size of space for, for example, constructing a plant becomes advantageous.

Without being specifically described in the above-described embodiment, in step S14 (or step S44), it is possible to provide a step of confirming the remaining amount in the storage device at the end of the present term based on the first reference amount to be supplied when the remaining amount in the storage device 20 at the beginning of the present term is decided to fall within the reference range. In this case, in the step, the processing may advance to step S15 (or step S45) when the remaining amount in the storage device at the end of the present term is decided in the step to fall within the reference range, or the processing may advance to step S19 (step S49) when the remaining amount in the storage device at the end of the present term is decided in the step not to fall within the reference range. By adding this step, when the first reference amount to be supplied is used as an amount of hydrogen to be supplied in the present term (i.e., step S17 or step S47), the next term can be started in a condition where the remaining amount in the storage device falls within the reference range. Thus, variation of the amount of hydrogen in the storage device 20 can be reduced, and variation in operation can be minimized. In addition, when the first reference amount to be supplied is used as an amount of hydrogen to be supplied, it is possible to prevent the amount of remaining hydrogen in the storage device 20 from being reduced to the halt condition, and operation of the second production device 40 can be continued.

Detailed description of embodiments (including modifications thereof) of the present invention are provided above with reference to figures, but specific constitutions of the present invention are not limited to the embodiments, and, for example, other designs may be included without departing from the spirit of the present invention.

[Simulation]

Simulation results of a plant operation when any one of the first embodiment or the second embodiment is used are described. Also, simulation results when the first embodiment or the second embodiment is not used are described for comparison. Hereinafter, case 1 is a case where the first embodiment or the second embodiment is not used (i.e., a case according to prior art). Case 2 is a case where the first embodiment or the second embodiment is used, in which an amount of hydrogen supplied from the storage device 20 to the second production device 40 is changed every 30 days. Case 3 is a case where the first embodiment or the second embodiment is used, in which an amount of hydrogen supplied from the storage device 20 to the second production device 40 is changed every 4 days.

Figure 9:
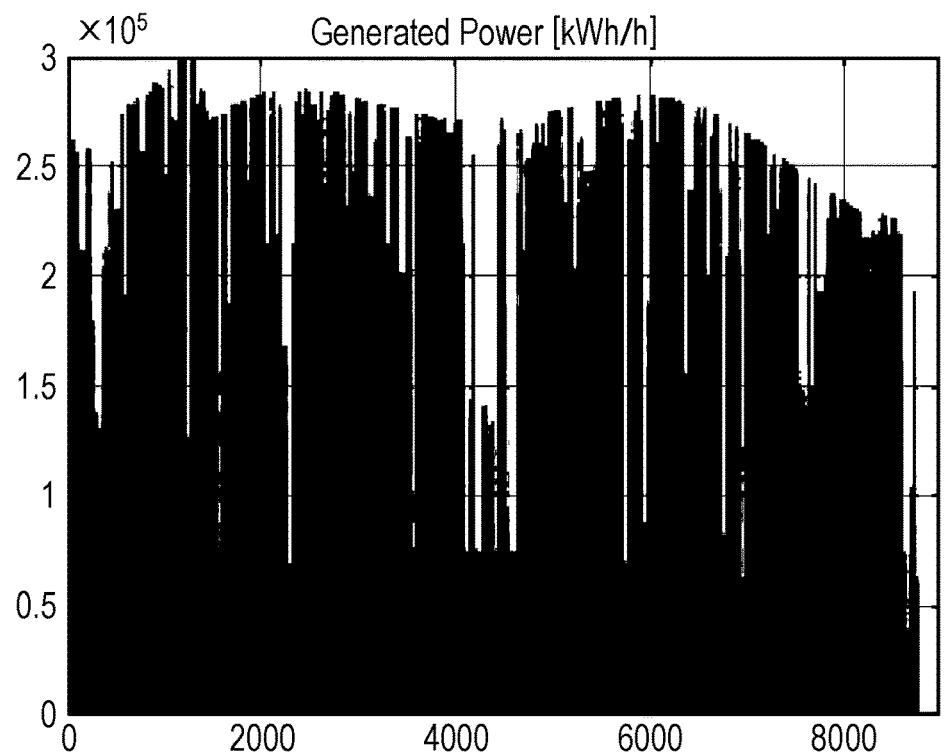
FIG. 9 is a line graph showing a chronological change in generated electric power that is a precondition for simulation.
Figure 10:
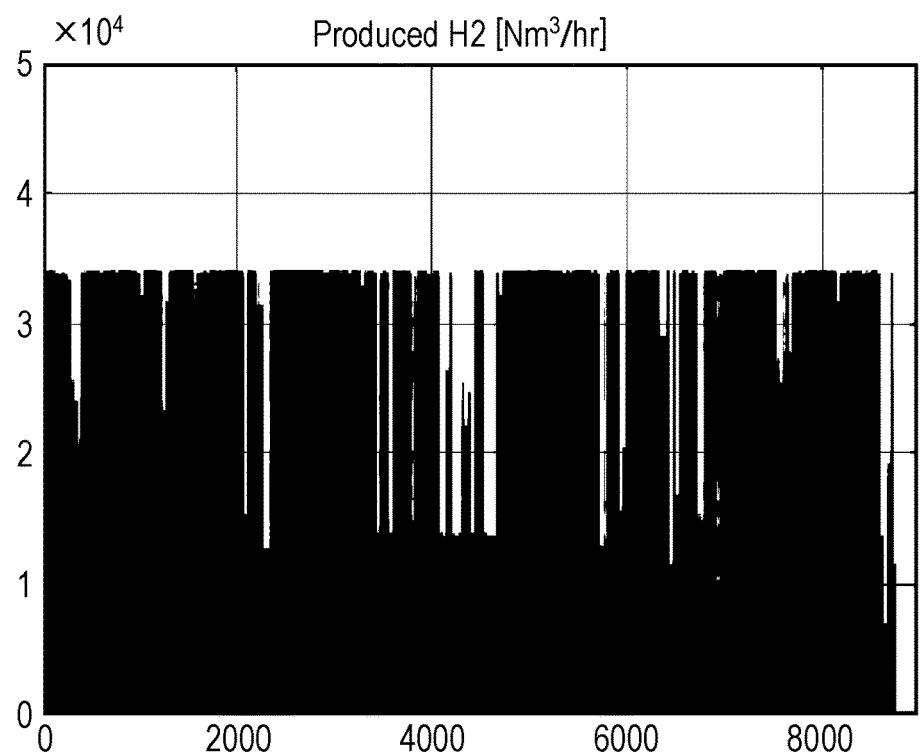
FIG. 10 is a line graph showing a chronological change in the amount of hydrogen production that is a precondition for simulation.

FIG. 9 and FIG. 10 are graphs showing conditions that are precondition for simulation. These preconditions are common among cases 1 to 3. Specifically, FIG. 9 is a line graph showing a chronological change in generated electric power (i.e., electric power supplied by the power supply device 2 to the first production device 10). In FIG. 9, the horizontal axis represents time (unit: hour), and the vertical axis represents generated electric power (unit: 100,000 kilowatts). The total length of time shown in the graph is 1 year (8760 hours). FIG. 10 is a line graph showing a chronological change in the amount of hydrogen produced by the first production device 10 by water electrolysis per unit time. In FIG. 10, the horizontal axis represents time (unit: hour), and the vertical axis represents the amount of hydrogen (unit: 10,000 normal cubic meters per hour). The amount of one "normal cubic meter" is one cubic meter of gas under standard conditions ((0 degrees centigrade and 1 atmospheric pressure). As shown in the figures, the amount of hydrogen shown in FIG. 10 correlates with the generated electric power shown in FIG. 9.

(Case 1 (Case for Comparison))

Figure 11:
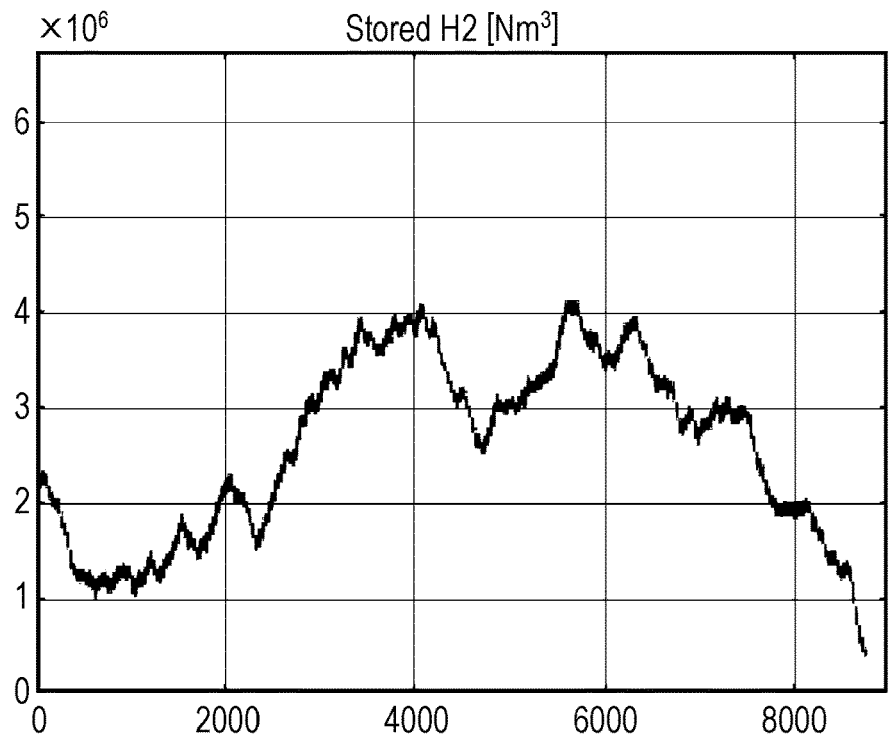
FIG. 11 is a line graph showing a chronological change in the amount of hydrogen storage in a storage device in case 1 (case for comparison) in simulation.
Figure 12:
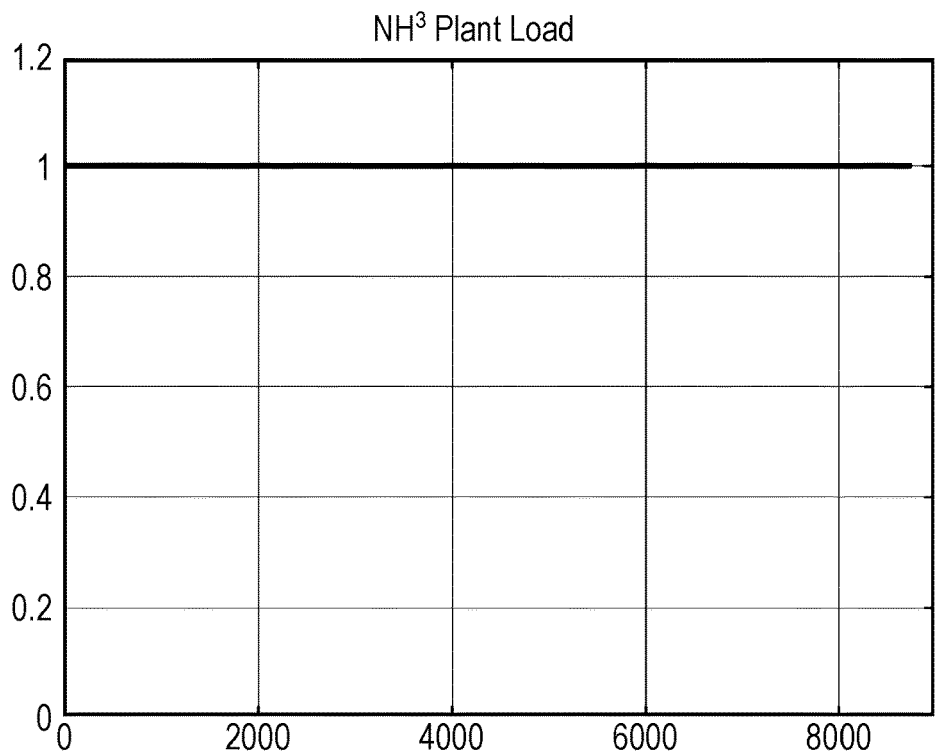
FIG. 12 is a line graph showing a chronological change in load on a second production device in case 1 (case for comparison) in simulation.

FIG. 11 and FIG. 12 show the results of case 1. That is, FIG. 11 and FIG. 12 are graphs showing the simulation results in which the first embodiment or the second embodiment is not used. Specifically, FIG. 11 is a line graph showing a chronological change in the amount of hydrogen stored in the storage device 20. In FIG. 11, the horizontal axis represents time (unit: hour), and the vertical axis represents the amount of hydrogen stored (unit: 1,000,000 normal cubic meters). FIG. 12 is a line graph showing a chronological change in load on the second production device 40 ($NH_3$ production plant). In FIG. 12, the horizontal axis represents time (unit: hour), and the vertical axis represents a load (dimensionless ratio) on the $NH_3$ production plant. In the case shown in FIG. 12, the load on the $NH_3$ production plant is 100% throughout the term (1 year). That is, there is no variation in the operation of the $NH_3$ production plant. As shown in FIG. 11, the maximum amount of hydrogen stored in the storage device 20 is about $4.0 \times 10^6$ $Nm^3$ (normal cubic meter). The required amount of hydrogen storage is an amount that is supplied in 20 days in an average amount of hydrogen to be supplied per day.

(Case 2)

Figure 13:
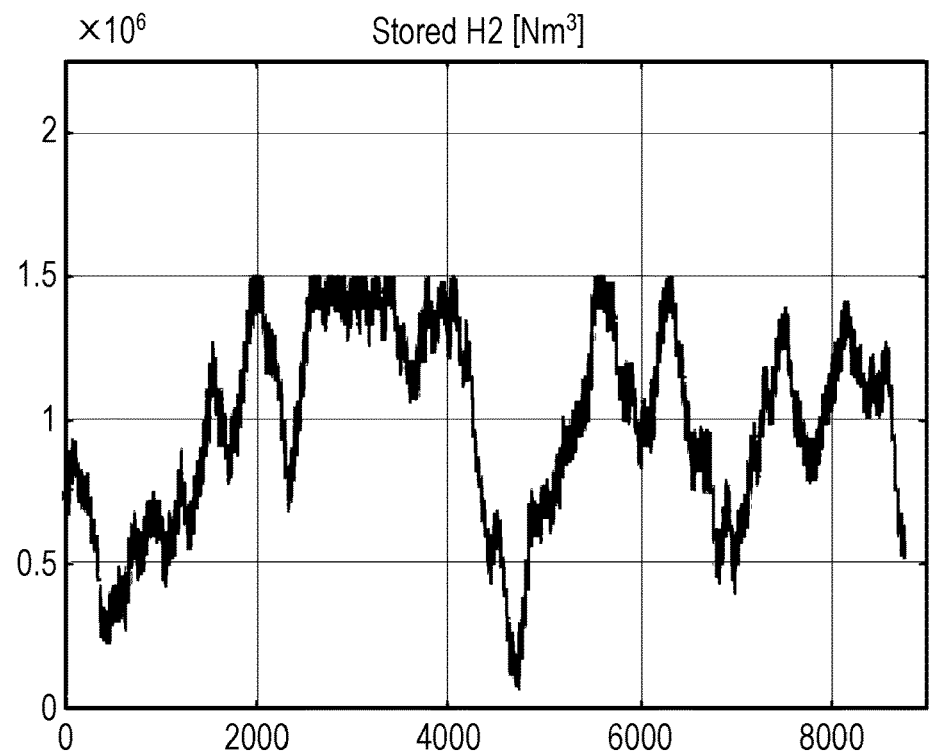
FIG. 13 is a line graph showing a chronological change in the amount of hydrogen storage in a storage device in case 2 in simulation.
Figure 14:
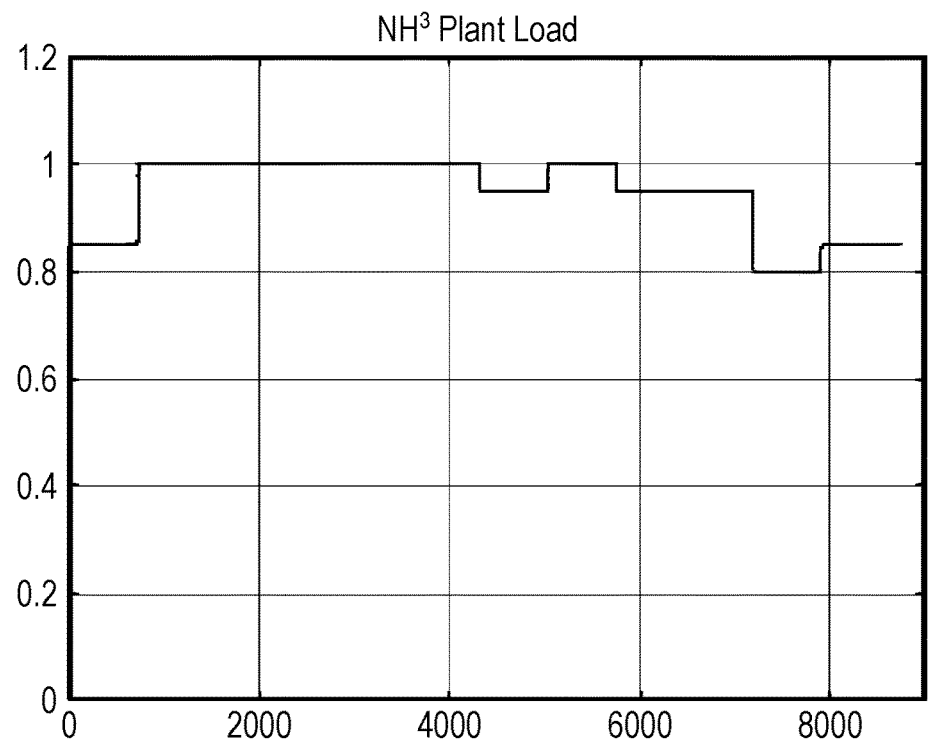
FIG. 14 is a line graph showing a chronological change in load on a second production device in case 2 in simulation.

FIG. 13 and FIG. 14 show the results of case 2. That is, FIG. 13 and FIG. 14 are graphs showing the simulation results in which the first embodiment or the second embodiment is used. In case 2, the operation of the $NH_3$ production plant is changed every 30 days. FIG. 13 is a line graph showing a chronological change in the amount of hydrogen stored in the storage device 20. The horizontal axis and the vertical axis of FIG. 13 are the same as those in FIG. 11. FIG. 14 is a line graph showing a chronological change in load on the second production device 40 ($NH_3$ production plant). The horizontal axis and the vertical axis of FIG. 14 are the same as those in FIG. 12. In case 2, the load on the $NH_3$ production plant falls within a range from 80% as the minimum to 100% as the maximum. As shown in FIG. 13, the maximum amount of hydrogen stored in the storage device 20 is about $1.5 \times 10^6$ $Nm^3$. The required amount of hydrogen storage is an amount supplied in 7.5 days in an average amount of hydrogen to be supplied per day. In other words, when the amount of hydrogen stored is in an amount for supplying 7.5 days, the load can be changed every 30 days to cope with the time in which the amount of hydrogen storage decreases (e.g., from about 4000 hours to about 5500 hours in FIG. 13), and the operation with the upper limit of 100% and the lower limit of 80% can be realized.

The maximum amount of hydrogen storage in case 2 of $1.5 \times 10^6$ $Nm^3$ is about 38% of that in case 1. The load on the $NH_3$ production plant per year in case 2 is about 94.5% (Capacity factor: 94.5%). That is, in case 2, although the load is slightly decreased as compared to case 1, the capacity of the storage device 20 (hydrogen tank) can be reduced by about 62% as compared to case 1.

(Case 3)

Figure 15:
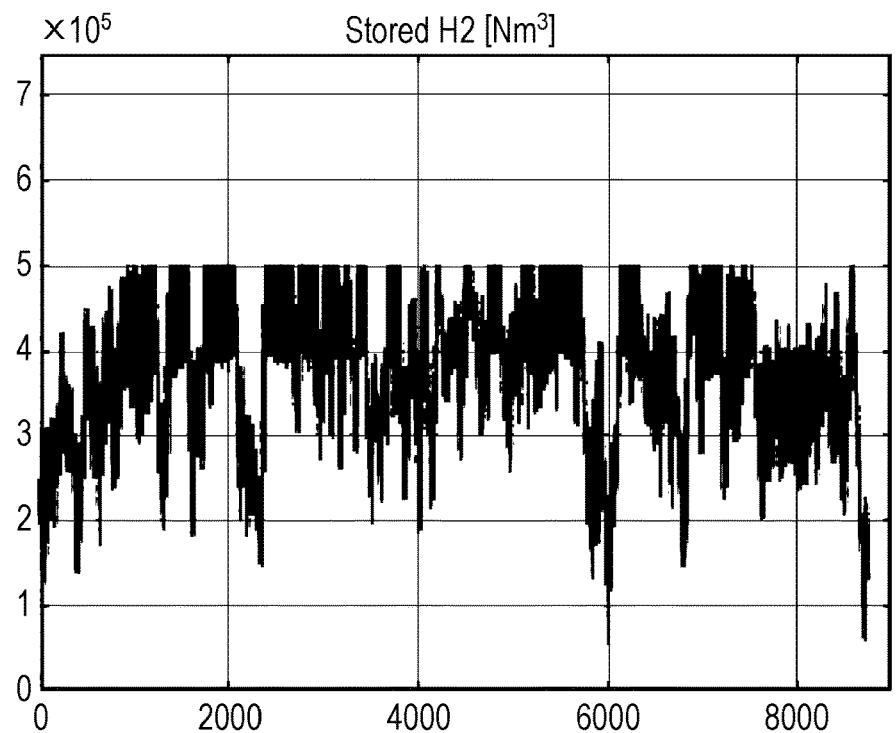
FIG. 15 is a line graph showing a chronological change in the amount of hydrogen storage in a storage device in case 3 in simulation.
Figure 16:
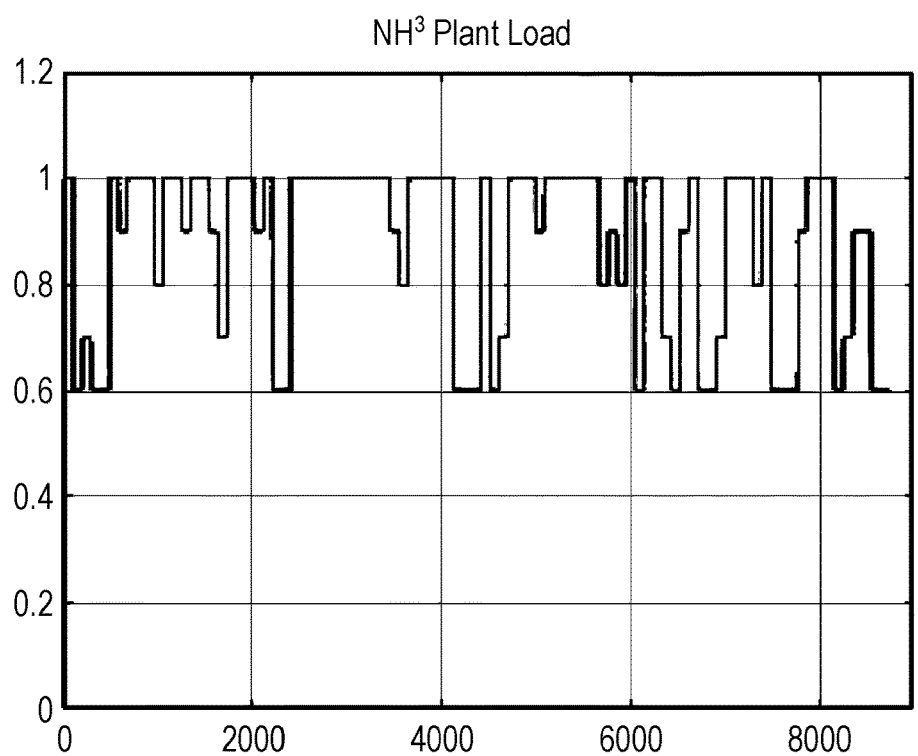
FIG. 16 is a line graph showing a chronological change in load on a second production device in case 3 in simulation.

FIG. 15 and FIG. 16 show the results of case 3. That is, FIG. 15 and FIG. 16 are graphs showing the simulation results when the first embodiment or the second embodiment is used. In case 3, the operation of the $NH_3$ production plant is changed, for example, every 4 days based on the prediction by the prediction unit 242 (FIG. 6). FIG. 15 is a line graph showing a chronological change in the amount of hydrogen stored in the storage device 20. The horizontal axis of FIG. 15 is the same as those in FIG. 11 and FIG. 13. The unit of the vertical axis of FIG. 15 is 100,000 normal cubic meters. FIG. 16 is a line graph showing a chronological change in the load on the second production device 40 ($NH_3$ production plant). The horizontal axis and the vertical axis of FIG. 16 are the same as those in FIG. 12 and FIG. 14. In case 3, the load on the $NH_3$ production plant is within a range from 60% as the minimum to 100% as the maximum. As shown in FIG. 15, the maximum amount of hydrogen stored in the storage device 20 is about $5.0 \times 10^5$ $Nm^3$. The required amount of hydrogen storage is an amount that is supplied in 2.5 days in an average amount of hydrogen to be supplied per day.

The maximum amount of hydrogen storage in case 3 of $5.0 \times 10^5$ $Nm^3$ is about 13% of that in case 1. The load on the $NH_3$ production plant per year in case 3 is about 87.3% (Capacity factor: 87.3%). That is, in case 3, although the load is further decreased as compared to case 2, the capacity of the storage device 20 (hydrogen tank) can be reduced by about 87% as compared to case 1.

The results of simulations described above show that the capacity of the storage device 20 can be reduced by using the first embodiment or the second embodiment. In addition, even when the first embodiment or the second embodiment is used, the operation within a range of load of the $NH_3$ production plant is possible.

INDUSTRIAL APPLICABILITY

The present invention can be used in, for example, a production plant using variable renewable energy. However, the field where the present invention can be used is not limited to the field described herein.

REFERENCE SINGS LIST

1 Plant
2 Electric power supply device
10 First production device
20 Storage device
30 Flow control valve
40 Second production device
201, 202 Plant control device
210 Input/output unit
221, 222 Unit for determining amount of hydrogen to be supplied
230 Parameter storage unit
241 Unit for storing actual amount supplied
242 Prediction unit
250 Remaining stored amount acquisition unit

The invention claimed is:
1. A plant control method,
for the purpose of controlling a plant that has
a first production device for producing hydrogen by water electrolysis using electric power generated by a power supply device that generates electric power using variable renewable energy, a storage device for at least temporarily storing the hydrogen produced by the first production device, a second production device for producing a substance selected from any one of ammonia, methanol, organic hydrides, methane, carbon monoxide, light oil and hydrogen peroxide using the hydrogen supplied from the storage device as a raw material, and a plant control device for controlling an amount of hydrogen to be supplied to the second production device from the storage device, wherein the power supply device is configured to supply the generated electric power to at least the first production device, wherein the plant control device calculates a first reference amount to be supplied that is used as a first reference for calculating an amount of hydrogen to be supplied to the second production device in a subject term;

the plant control device makes a decision on whether or not an amount of remaining hydrogen in the storage device at the beginning of the subject term falls within a predetermined reference range; and when the amount of remaining hydrogen falls within the reference range, the plant control device makes a decision on whether or not the first reference amount to be supplied is, with respect to hydrogen consumption in the second production device, an amount of a lower limit of consumption or more and an upper limit of consumption or less, and when the first reference amount to be supplied is decided to be, with respect to hydrogen consumption in the second production device, the amount of the lower limit of consumption or more and the upper limit of consumption or less, performing control such that the first reference amount to be supplied is used as an amount of hydrogen to be supplied from the storage device to the second production device in the subject term, or when the amount of remaining hydrogen does not fall within the reference range, calculating a second reference amount to be supplied that is used as a second reference of an amount of hydrogen to be supplied to the second production device, the second reference allowing the amount of remaining hydrogen in the storage device at the end of the subject term to fall within the reference range, and the plant control device makes a decision on whether or not the second reference amount to be supplied is, with respect to hydrogen consumption in the second production device, the amount of the lower limit of consumption or more and the upper limit of consumption or less, and when the second reference amount to be supplied is decided to be, with respect to hydrogen consumption in the second production device, the amount of the lower limit of consumption or more and the upper limit of consumption or less, performing control such that the second reference amount to be supplied is used as an amount of hydrogen to be supplied from the storage device to the second production device in the subject term.

2. The plant control method according to claim 1, wherein when the amount of remaining hydrogen falls within the reference range, according to the first reference amount to be supplied, when the first reference amount to be supplied is an amount of more than the upper limit of consumption, performing control such that the upper limit of consumption is used as an amount of hydrogen to be supplied from the storage device to the second production device in the subject term, or when the first reference amount to be supplied is an amount of less than the lower limit of consumption, performing control such that the lower limit of consumption is used as an amount of hydrogen to be supplied from the storage device to the second production device in the subject term.

3. The plant control method according to claim 1, wherein, when the amount of remaining hydrogen does not fall within the reference range, according to the second reference amount to be supplied, when the second reference amount to be supplied is an amount of more than the upper limit of consumption, performing control such that the upper limit of consumption is used as an amount of hydrogen to be supplied from the storage device to the second production device in the subject term, or when the second reference amount to be supplied is an amount of less than the lower limit of consumption, performing control such that the lower limit of consumption is used as an amount of hydrogen to be supplied from the storage device to the second production device in the subject term.

4. The plant control method according to claim 3, comprising, when the second reference amount to be supplied is the amount of less than the lower limit of consumption, performing control such that the lower limit of consumption is used as the amount of hydrogen to be supplied from the storage device to the second production device in the subject term, and in the case where the lower limit of consumption is used as the amount of hydrogen to be supplied from the storage device to the second production device in the subject term, when the amount of remaining hydrogen in the storage device at the end of the subject term falls below a halt reference amount that is smaller than the lower limit of the reference range, performing control such that operation of the second production device is halted.

5. The plant control method according to claim 1, wherein the first reference amount to be supplied is calculated based on an amount of hydrogen actually produced by the first production device in a reference term that is different from the subject term.

6. The plant control method according to claim 1, wherein the first reference amount to be supplied is calculated based on a predictive amount of the variable renewable energy supplied to the first production device in the subject term.

7. The plant control method according to claim 6, wherein the electric power derived from variable renewable energy is electric power produced by photovoltaic power generation, and the first reference amount to be supplied is calculated based on a predictive amount of solar radiation in the subject term; or the electric power derived from variable renewable energy is electric power produced by wind electric power generation, and the first reference amount to be supplied is calculated based on a predictive volume of air in the subject term.

8. The plant control method according to claim 1, wherein when the amount of remaining hydrogen falls within the reference range, confirm an amount of remaining hydrogen in the storage device at the end of the subject term based on the first reference amount to be supplied, and when the amount of remaining hydrogen in the storage device at the end of the subject term does not fall within the reference range,
calculate the second reference amount to be supplied, and the plant control device makes a decision on whether or not the second reference amount to be supplied instead of the first reference amount to be supplied is, with respect to hydrogen consumption in the second production device, the amount of the lower limit of consumption or more and the upper limit of consumption or less,
the plant control device makes a decision on whether or not the second reference amount to be supplied is, with respect to hydrogen consumption in the second production device, the amount of the lower limit of consumption or more and the upper limit of consumption or less, and when the second reference amount to be supplied is decided to be, with respect to hydrogen consumption in the second production device, the amount of the lower limit of consumption or more and the upper limit of consumption or less, performing control such that the second reference amount to be supplied is used as an amount of hydrogen to be supplied from the storage device to the second production device in the subject term,
when the second reference amount to be supplied is an amount of more than the upper limit of consumption, performing control such that the upper limit of consumption is used as an amount of hydrogen to be supplied from the storage device to the second production device in the subject term, or
when the second reference amount to be supplied is an amount of less than the lower limit of consumption, performing control such that the lower limit of consumption is used as an amount of hydrogen to be supplied from the storage device to the second production device in the subject term.

9. The plant control method according to claim 1, wherein
when the amount of remaining hydrogen falls within the reference range, confirm an amount of remaining hydrogen in the storage device at the end of the subject term based on the first reference amount to be supplied, and when the amount of remaining hydrogen in the storage device at the end of the subject term falls within the reference range,
the plant control device makes a decision on whether or not the first reference amount to be supplied is, with respect to hydrogen consumption in the second production device, the amount of the lower limit of consumption or more and the upper limit of consumption or less, and when the first reference amount to be supplied is decided to be, with respect to hydrogen consumption in the second production device, the amount of the lower limit of consumption or more and the upper limit of consumption or less, performing control such that the first reference amount to be supplied is used as an amount of hydrogen to be supplied from the storage device to the second production device in the subject term,
when the first reference amount to be supplied is an amount of more than the upper limit of consumption, performing control such that the upper limit of consumption is used as an amount of hydrogen to be supplied from the storage device to the second production device in the subject term, or
when the first reference amount to be supplied is an amount of less than the lower limit of consumption, performing control such that the lower limit of consumption is used as an amount of hydrogen to be supplied from the storage device to the second production device in the subject term.

* * * * *